(12) United States Patent
Yokouchi

(10) Patent No.: US 11,659,131 B2
(45) Date of Patent: May 23, 2023

(54) METHOD AND COMPUTER PROGRAM PRODUCT FOR PREDICTING SPECTRAL CHARACTERISTICS OF INK APPLIED TO A BASE MATERIAL

(71) Applicant: SCREEN HOLDINGS CO., LTD., Kyoto (JP)

(72) Inventor: Kenichi Yokouchi, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 17/732,836

(22) Filed: Apr. 29, 2022

(65) Prior Publication Data

US 2022/0368811 A1 Nov. 17, 2022

(30) Foreign Application Priority Data

May 6, 2021 (JP) .............................. JP2021-078537

(51) Int. Cl.
*H04N 1/60* (2006.01)
*H04N 1/54* (2006.01)

(52) U.S. Cl.
CPC ............ *H04N 1/6038* (2013.01); *H04N 1/54* (2013.01); *H04N 1/6027* (2013.01)

(58) Field of Classification Search
None
See application file for complete search history.

(56) References Cited

U.S. PATENT DOCUMENTS

| 8,040,561 B2 * | 10/2011 | Horita | H04N 1/603 358/1.9 |
| 8,311,321 B2 * | 11/2012 | Horita | H04N 1/603 358/1.9 |
| 8,373,897 B2 * | 2/2013 | Horita | H04N 1/603 358/1.9 |

(Continued)

FOREIGN PATENT DOCUMENTS

| JP | 2011217222 A | * 10/2011 |
| JP | 2020-159821 A | 10/2020 |
| WO | 2019/234102 A1 | 12/2019 |

OTHER PUBLICATIONS

K. Deshpande et al., "Recommendations for predicting spot color overprints", (http://www.color.org/ICC_white_paper_43_Draft2kd. doc), retrieved Jun. 7, 2018.

*Primary Examiner* — Scott A Rogers
(74) *Attorney, Agent, or Firm* — McDermott Will & Emery LLP

(57) ABSTRACT

First relational equations which represent characteristics of respective sample colors are obtained, and for the respective sample colors, prediction values of spectral characteristics of characteristics-acquired gradation values for a prediction target color are obtained using the first relational equations. Difference values between the prediction values and actual measurement values are obtained, and a sample color for which a minimum difference value is obtained is selected as a reference color. A second relational equation that represents characteristics of the reference color is obtained, and a prediction value of spectral characteristics of a prediction target gradation value for the prediction target color is obtained using the second relational equation.

13 Claims, 17 Drawing Sheets

(56) References Cited

U.S. PATENT DOCUMENTS

| | | | |
|---|---|---|---|
| 11,410,004 B2* | 8/2022 | Yokouchi | H04N 1/6097 |
| 2007/0263265 A1* | 11/2007 | Sekine | H04N 1/603 |
| | | | 358/518 |
| 2008/0282915 A1 | 11/2008 | Horita | |
| 2020/0314290 A1 | 10/2020 | Yokouchi | |
| 2022/0131998 A1* | 4/2022 | Morovic | G06N 20/20 |

* cited by examiner

| WAVELENGTH | ACTUAL MEASUREMENT VALUES | PREDICTION VALUES OBTAINED FOR SAMPLE COLOR C1 | PREDICTION VALUES OBTAINED FOR SAMPLE COLOR C2 | ..... |
|---|---|---|---|---|
| 380 | Vr(1) | Vp(1)(1) | Vp(2)(1) | ..... |
| 390 | Vr(2) | Vp(1)(2) | Vp(2)(2) | ..... |
| 400 | Vr(3) | Vp(1)(3) | Vp(2)(3) | ..... |
| ⋮ | ⋮ | ⋮ | ⋮ | ⋮ |
| 710 | Vr(34) | Vp(1)(34) | Vp(2)(34) | ..... |
| 720 | Vr(35) | Vp(1)(35) | Vp(2)(35) | ..... |
| 730 | Vr(36) | Vp(1)(36) | Vp(2)(36) | ..... |

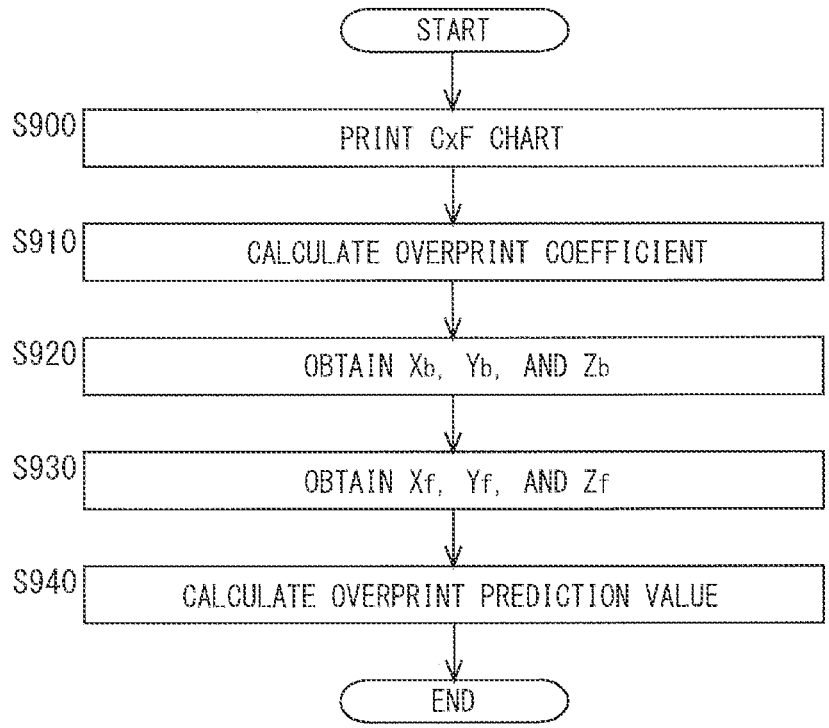
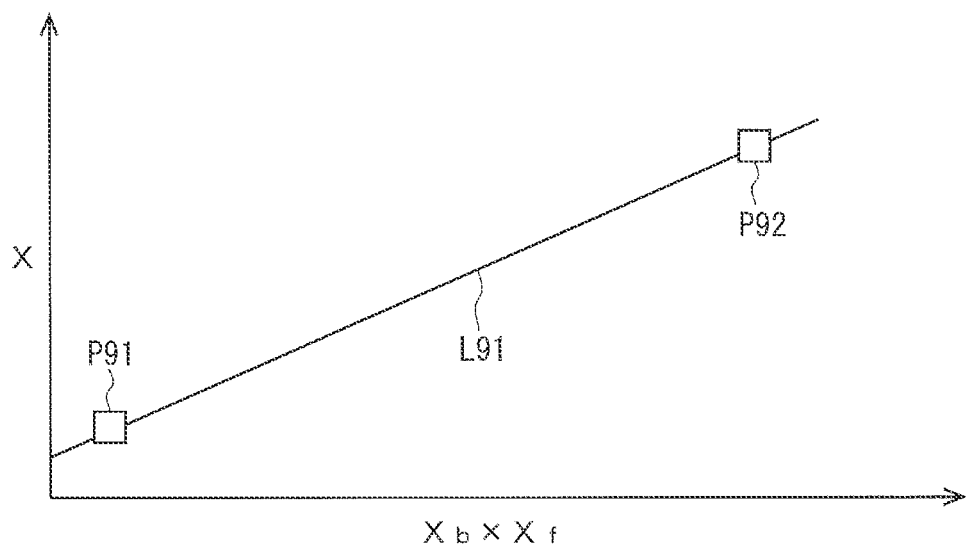

METHOD AND COMPUTER PROGRAM PRODUCT FOR PREDICTING SPECTRAL CHARACTERISTICS OF INK APPLIED TO A BASE MATERIAL

CROSS REFERENCE TO RELATED APPLICATION

This application claims the benefit of Japanese Application No. 2021-078537, filed on May 6, 2021, the entire contents of each are hereby incorporated by reference.

BACKGROUND OF THE INVENTION

Field of the Invention

The present invention relates to a method predicting spectral characteristics (for example, spectral reflectances) obtained by applying ink on a base material.

Description of Related Art

In recent years, digital printing apparatuses have become popular in the printing industry. However, in the labeling and packaging field, printing (offset printing, gravure printing, flexographic printing, etc.) with printing apparatuses using printing plates (hereinafter referred to as a "conventional printing apparatus" or simply referred to as a "printing apparatus") is still often performed in recent years. Meanwhile, there is an increasing demand for quick delivery for design and content production, and when there are some changes in design or the like in a case in which a conventional printing apparatus is used, cost for recreation of the printing plate or retrogression of the process is high, which is a significant problem. In this respect, a digital printing apparatus does not use a printing plate, and thus, does not need an operation for exchanging or recreating the printing plate. That is, by adopting a digital printing apparatus, it is possible to carry out especially small-lot printing at low cost, and therefore, it is also possible to respond to the demand of quick delivery for design and content production at low cost.

Meanwhile, in the labeling and packaging field, spot colors tend to be often used for enhancing color expression. For this reason, in order to perform printing with a digital printing apparatus using print data generated for printing with a conventional printing apparatus, it is necessary that colors obtained by overprinting spot color inks be predicted and the predicted colors be reproduced with the digital printing apparatus. In the following, prediction values of values (specifically, reflectance or tristimulus values X, Y, and Z in the CIE 1931 XYZ color space) identifying colors obtained by overprinting inks of a plurality of colors is referred to as an "overprint prediction value".

The "Recommendations for predicting spot color overprints" (http://www.color.org/ICC_white_paper_43_Draft2 kd.doc) by K. Deshpande and P. Green discloses a method (hereinafter, referred to as "Deshpande et al. method") for relatively easily predicting colors (overprint prediction values) obtained by overprinting inks of a plurality of colors including a spot color. In the Deshpande et al. method, overprint prediction values are expressed as in the following Equations (1) to (3) using tristimulus values X, Y, and Z (see FIG. 19).

$$X = j_x \times (X_b \times X_f) + k_x \quad (1)$$

$$Y = j_y \times (Y_b \times Y_f) + k_y \quad (2)$$

$$Z = j_z \times (Z_b \times Z_f) + k_z \quad (3)$$

Here, $X_b$, $Y_b$, and $Z_b$ are tristimulus values of a background color, $X_f$, $Y_f$, and $Z_f$ are tristimulus values of a foreground color, $j_x$, $j_y$, and $j_z$ are scaling coefficients, and $k_x$, $k_y$, and $k_z$ are constants. Hereinafter, $j_x$, $j_y$, $j_z$, $k_x$, $k_y$, and $k_z$ are collectively referred to as "overprint coefficient".

Meanwhile, color reproduction methods include additive color mixing and subtractive color mixing. In the case of printing, the subtractive color mixing is applied for color reproduction. In this regard, if ideal subtractive color mixing is performed, the stimulus value X of the color obtained by overprinting is represented by "$X_b \times X_f$" (the same applies to the stimulus values Y and Z), for example. However, in order to obtain a more accurate value, it is necessary to make a correction in consideration of an error caused by the use of an opaque ink and reflection of light on the surface. Therefore, in the Deshpande et al. method, a correction using a linear equation is performed as shown in the above Equations (1) to (3).

In the Deshpande et al. method, a color chart as schematically shown in FIG. 20 is used, for example. This color chart is called a "C×F chart". In the example shown in FIG. 20, the C×F chart is composed of twenty-two patches. The eleven patches in the upper part are patches obtained by printing an ink of a target spot color on a base material such as paper at a dot percentage in increments of 10%. The eleven patches in the lower part are patches obtained by printing an ink of a target spot color on black (black solid) at a dot percentage in increments of 10%. As above, the C×F chart includes a plurality of patches corresponding to ink densities of a plurality of levels. The overprint prediction value is calculated using the value (colorimetry value) obtained by the colorimetry of the patches in the CHF chart described above.

Hereinafter, the Deshpande et al. method will be described in detail with reference to the flowchart in FIG. 21, taking, as an example, calculation of an overprint prediction value in the case where a background color is a spot color at a dot percentage of 40% (referred to as a "spot color 1" for convenience) and a foreground color is another spot color at a dot percentage of 60% (referred to as a "spot color 2" for convenience).

First, the C×F chart is printed using the ink of spot color 1, and further, the C×F chart is printed using the ink of spot color 2 (step S900).

Next, the overprint coefficients $j_x$, $j_y$, $j_z$, $k_x$, $k_y$, and $k_z$ of the above Equations (1) to (3) regarding the spot color 2 are calculated using the C×F chart printed using the ink of spot color 2 (referred to as "spot color 2 chart" for convenience) (step S910). In this regard, focusing on the above Equation (1), for example, the practical maximum value and the minimum value for $X_b \times X_f$ are values obtained by the ink of the spot color 2 being applied on the base material and black (black solid), respectively. The same applies to $Y_b \times Y_f$ and $Z_b \times Z_f$. Therefore, in order to calculate the overprint coefficient, in a coordinate system representing the above Equations (1) to (3) (see FIG. 22. Note that FIG. 22 shows only the coordinate system representing the above Equation (1)), the coordinates representing the stimulus value of a state where the ink of the spot color 2 at a dot percentage of 60% is applied on black are defined as a first calibration point P91, and the coordinates representing the stimulus value of a state where the ink of the spot color 2 at a dot percentage of 60% is applied on the base material are defined as a second calibration point P92.

Focusing on, for example, X among the tristimulus values, values are assigned as follows for the first calibration point P91 with respect to the above Equation (1). The value obtained by colorimetry of the patch PA93 in the spot color 2 chart (black stimulus value) is assigned to $X_b$, the value obtained by colorimetry of the patch PA92 in the spot color 2 chart (stimulus value of a state where the ink of the spot color 2 at a dot percentage of 60% is applied on the base material) is assigned to $X_f$, and the value obtained by colorimetry of the patch PA91 in the spot color 2 chart (stimulus value of a state where the ink of the spot color 2 at a dot percentage of 60% is applied on black) is assigned to X (see FIG. 20). In addition, for the second calibration point P92, values are assigned as follows with respect to the above Equation (1). The value obtained by colorimetry of the patch PA94 in the spot color 2 chart (stimulus value of base material) is assigned to $X_b$, the value obtained by colorimetry of the patch PA92 in the spot color 2 chart (stimulus value of a state where the ink of the spot color 2 at a dot percentage of 60% is applied on the base material) is assigned to $X_f$ and X (see FIG. 20).

The overprint coefficients $j_x$ and $k_x$ are calculated by solving a simultaneous equation consisting of the equation relating to the first calibration point P91 and the equation relating to the second calibration point P92. That is, an equation representing a straight line denoted by reference numeral L91 in FIG. 22 is obtained. The overprint coefficients $j_y$, $j_z$, $k_y$, and $k_z$ are similarly calculated.

Although the patches are provided in 10% increments in the C×F chart shown in FIG. 20, an overprint coefficient corresponding to the dot percentage between two patches which are adjacent to each other in the horizontal direction can be obtained on the basis of the colorimetric values obtained by linear interpolation.

Next, the values of $X_b$, $Y_b$, and $Z_b$ (tristimulus values of the background color) for calculating final overprint prediction values in the above Equations (1) to (3) are obtained using the C×F chart printed using the ink of spot color 1 (referred to as "spot color 1 chart" for convenience) (step S920). Specifically, the values of $X_b$, $Y_b$, and $Z_b$ are obtained by colorimetry of the patch PA95 (see FIG. 20) in the spot color 1 chart.

Next, the values of $X_f$, $Y_f$, and $Z_f$ (tristimulus values of the foreground color) for calculating the final overprint prediction values in the above Equations (1) to (3) are obtained using the spot color 2 chart (step S930). Specifically, the values of $X_f$, $Y_f$, and $Z_f$ are obtained by colorimetry of the patch PA92 (see FIG. 20) in the spot color 2 chart.

Finally, the values obtained in steps S910 to S930 are substituted into the above Equations (1) to (3), whereby the tristimulus values X, Y, and Z as overprint prediction values are calculated (step S940). This corresponds to, for example, calculating, as the value of K, the ordinate value of the straight line L91 in FIG. 22 when the abscissa indicates the product of "$X_b$ calculated in step S920" and "$X_f$ calculated in step S930".

In the above processing, the values of X, $X_f$, and $X_b$ relating to the first calibration point P91 (see FIG. 22) are obtained by colorimetry of the patches PA91, PA92, and PA93 in the spot color 2 chart. However, if a highly accurate overprint prediction value is not necessary, the first calibration point P91 can be regarded as being located at the origin of the graph in FIG. 22 for simplicity. In this case, the colorimetry of the patches PA91 and PA93 in the spot color 2 chart is not necessary (the colorimetry of the patch PA92 is still necessary for obtaining the values of X and $X_f$ of the second calibration point P92). In this case, the tristimulus values X, Y, and Z as the overprint prediction values can be calculated without printing the lower patch group including the patches PA91 and PA93 in the C×F chart shown in FIG. 20. The C×F chart having the upper patch group shown in FIG. 20 without having the lower patch group is herein referred to as a "simple C×F chart" for convenience.

As described above, according to the Deshpande et al. method, color prediction is performed using a C×F chart, for example, as shown in FIG. 20. However, even when printing using spot colors is performed, such a C×F chart is usually not printed in advance. For this reason, it is necessary to print the same number of C×F charts as the same number of the spot colors and perform colorimetry of the respective patches. This causes an increase in cost and man-hours.

Accordingly, the applicant of the present application filed for an invention of a color prediction method for predicting the color of the patch to be included in the C×F chart (refer to Japanese Laid-Open Patent Publication No. 2020-159821). A schematic procedure of a color prediction process described in Japanese Laid-Open Patent Publication No. 2020-159821 is as follows. First, from among a plurality of sample colors for which spectral reflectances of a plurality of patches are obtained, a color close to a prediction target color is selected as a similar color. Next, for the similar color, a relational equation is obtained, which represents a relationship between spectral reflectances of a solid patch (a patch with a maximum ink density) and spectral reflectances of a color prediction target patch. Finally, the spectral reflectances of the solid patch for the prediction target color are applied to the relational equation, whereby prediction values of the spectral reflectances of the color prediction target patch for the prediction target color are obtained.

According to the invention disclosed in Japanese Laid-Open Patent Publication No. 2020-159821, spectral reflectances of a halftone patch can be predicted if the spectral reflectances of the solid patch for the prediction target color are obtained. Hence, without printing the C×F chart, it will be possible to obtain prediction values of spectral reflectances of a halftone patch when it is assumed that the C×F chart is printed. However, actually, the spectral reflectances of the halftone patch are sometimes obtained by color marks and the like. That is, for some halftone patches, calorimetric values are sometimes obtained without printing the C×F chart. In this case, regarding each of the halftone patches for which the colorimetric values are obtained, there is an error between actual measurement values (the colorimetric values) and prediction values. Accordingly, for example, in a case in which colorimetric values corresponding to a patch with a dot percentage of 50% are obtained, then as illustrated in FIG. 23, a color based on the actual measurement values and a color based on the prediction values mismatches largely with each other in terms of a relationship. In this regard, it is conceivable that, if there is a halftone patch with known colorimetric values, prediction accuracy improves using information on the calorimetric values.

Moreover, according to the Deshpande et al. method, it is premised that calorimetric values corresponding to dot percentages in increments of 10% are obtained; however, in recent years, a variety of operations have been made for targets of colorimetry. For example, in a case in which only three colorimetric values corresponding to three patches with dot percentages of 100%, 50%, and 0% are obtained for a certain color, spectral reflectances of any patch of another color is sometimes predicted on the basis of information on the three colorimetric values for the certain color. Therefore, preferably, spectral reflectances at any gradation value can be predicted regarding the prediction target color.

SUMMARY OF THE INVENTION

In view of such circumstances as described above, it is an object of the present invention to enable high accuracy, prediction or spectral characteristics of a prediction target gradation value for a prediction target color using information on known spectral characteristics in a case in which there is an intermediate gradation value for which spectral characteristics such as spectral reflectances are known regarding the prediction target color.

One aspect of the present invention is directed to a spectral characteristics prediction method for predicting spectral characteristics obtained by applying ink on a base material, the spectral characteristics prediction method including:

a prediction target color setting step of setting, to a prediction target color, an ink color for which spectral characteristics of a maximum gradation value, spectral characteristics of a minimum gradation value, and spectral characteristics of at least one intermediate gradation value are obtained;

a first relational equation calculation step or obtaining a first relational equation that, with an intermediate gradation value for which spectral characteristics are obtained regarding the prediction target color being taken as a characteristics-acquired gradation value, represents a relationship between spectral characteristics of the maximum gradation value and spectral characteristics of the characteristics-acquired gradation value for each of a plurality of sample colors which are a plurality of ink colors for each of which spectral characteristics of the maximum gradation value, spectral characteristics of the minimum gradation value, and spectral characteristics of at least one intermediate gradation value are obtained;

a first prediction step of, for each of the plurality of sample colors, obtaining prediction values of spectral characteristics of the characteristics-acquired gradation value for the prediction target color by applying the spectral characteristics of the maximum gradation value for the prediction target color to a corresponding first relational equation;

a difference value calculation step of, for each of the plurality of sample colors, obtaining a difference value between the prediction values obtained in the first prediction step and actual measurement values of spectral characteristics of the characteristics-acquired gradation value for the prediction target color;

reference color selection step of selecting, as a reference color, a sample color for which a minimum difference value is obtained in the difference value calculation step among the plurality of sample colors;

a second relational equation calculation step of, with the maximum gradation value or the characteristic-acquired gradation value being taken as a reference gradation value, and with a gradation value for which spectral characteristics are obtained regarding the reference color or the characteristics-acquired gradation value being taken as a process target gradation value, obtaining a second relational equation that represents a relationship between spectral characteristics of the reference gradation value and spectral characteristics of the process target gradation value for the reference color; and a second prediction step of, using the second relational equation, obtaining prediction values of spectral characteristics of a prediction target gradation value for the prediction target color.

With such a configuration, the first relational equations which represent the relationships between the spectral characteristics of the maximum gradation values and the spectral characteristics of the characteristics-acquired gradation value (the intermediate gradation value for which the spectral characteristics are obtained regarding the prediction target color) are obtained for each of the sample colors, and using the first relational equations for respective sample colors, the prediction values of the spectral characteristics of the characteristics-acquired gradation value for the prediction target color are obtained. Then, the difference values between the prediction values and the actual measurement values are obtained, and a sample color for which the minimum difference value is obtained is selected as the reference color second relational equation that represents characteristics of the reference color is obtained, and prediction values of spectral characteristics of a prediction target gradation value for the prediction target color is obtained using the second relational equation. As above, the spectral characteristics are predicted for the prediction target color using, as the reference color, the color in which known spectral characteristics for the prediction target color can be predicted with highest accuracy. Accordingly, highly accurate prediction values are obtained. Thus, in a case in which there is an intermediate gradation value for which the spectral characteristics are known regarding the prediction target color, high accuracy prediction of the spectral characteristics of the prediction target gradation values for the prediction target color is enabled using the information on the known spectral characteristics.

Another aspect of the present invention is directed to a non-transitory computer-readable recording medium recording a spectral characteristics prediction program of predicting spectral characteristics obtained by applying ink on a base material, wherein the spectral characteristics prediction program causes a computer to execute:

a prediction target color setting step of setting, to a prediction target color, an ink color for which spectral characteristics of a maximum gradation value, spectral characteristics of a minimum gradation value, and spectral characteristics of at least one intermediate gradation value are obtained;

a first relational equation calculation step of obtaining a first relational equation that, with an intermediate gradation value for which spectral characteristics are obtained regarding the prediction target color being taken as a characteristics-acquired gradation value, represents a relationship between spectral characteristics of the maximum gradation value and spectral characteristics of the characteristics-acquired gradation value for each of a plurality of sample colors which are a plurality of ink colors each of which spectral characteristics of the maximum gradation value, spectral characteristics of the minimum gradation value, and spectral characteristics of at least one intermediate gradation value are obtained;

a first prediction step of, for each of the plurality of sample colors, obtaining prediction values of spectral characteristics of the characteristics-acquired gradation value for the prediction target color by applying the spectral characteristics of the maximum gradation value for the prediction target color to a corresponding first relational equation;

a difference value calculation step of, for each of the plurality of sample colors, obtaining a difference value between the prediction values obtained in the first prediction step and actual measurement values of spectral characteristics of the characteristics-acquired gradation value for the prediction target color;

a reference color selection step of selecting, as a reference color, a sample color for which a minimum difference value is obtained in the difference value calculation step among the plurality of sample colors;

a second relational equation calculation step of, with the maximum gradation value or the characteristic-acquired gradation value being taken as a reference gradation value, and with a gradation value for which spectral characteristics are obtained regarding the reference color or the characteristics-acquired gradation value being taken as a process target gradation value, obtaining a second relational equation that represents a relationship between spectral characteristics of the reference gradation value and spectral characteristics of the process target gradation value for the reference color; and a second prediction of, using the second relational equation, obtaining prediction values of spectral characteristics of a prediction target gradation value for the prediction target color.

These and other objects, features, modes, and advantageous effects of the present invention will become more apparent from the following detailed description of the present invention with reference co the accompanying drawings.

BRIEF DESCRIPTION OF THE DRAWINGS

FIG. 21 is a flowchart for explaining the technique of Deshpande et al., relating to the conventional example.

FIG. 22 is a diagram for explaining the technique of Deshpande et al., relating to the conventional example.

DETAILED DESCRIPTION OF PREFERRED EMBODIMENTS

<0. Introduction>

Figure 1:
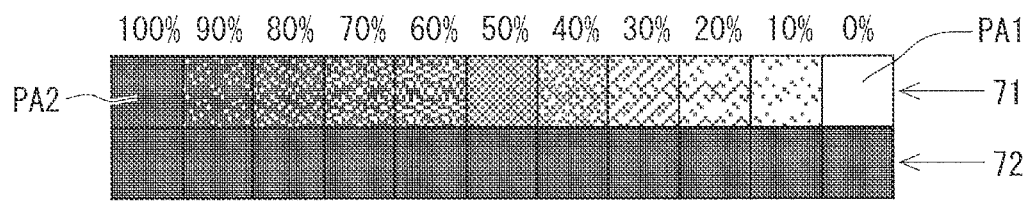
FIG. 1 is a diagram for explaining terms for use in the present specification regarding a C×F chart.

Prior to describing embodiments, terms for use in the present specification and basic matters related to the present invention will be described with reference to FIG. 1. Regarding a C×F chart illustrated in FIG. 1, patches on an upper stage (patches on a stage denoted by reference numeral 71) are patches obtained by printing target ink on a base material, and patches on a lower stage (patches on a stage denoted by reference numeral 72) are patches obtained by printing the target ink on black. A patch that represents a color of the base material itself (a patch denoted by reference symbol PA1 in FIG. 1) will be referred to as a "paper white patch," and a patch in a state of being solidly applied with the target ink (a patch denoted by reference symbol PA2 in FIG. 1) will be referred to as a "solid patch." However, in each of the following embodiments, processes are not performed while focusing on the patches, but the processes are performed while focusing on gradation values. Further, in each of the following embodiments, spectral reflectances obtained by printing the target ink on the base material are predicted.

As mentioned above, in each of the following embodiments, the processes are performed while focusing on the gradation values. In this regard, it is assumed that a maximum gradation value is 1, and that a minimum gradation value is 0. A state in which the ink is applied to the base material at a maximum ink density corresponds to the maximum gradation value, and a state in which the ink is not applied to the base material corresponds to the minimum gradation value. That is, the maximum gradation value corresponds to the solid patch PA2, and the minimum gradation value corresponds to the paper white patch PA1. When the gradation values and dot percentages are associated with each other, for example, a gradation value of 1 corresponds to a dot percentage of 100%, a gradation value of 0.5 corresponds to a dot percentage of 50%, and a gradation value of 0 corresponds to a dot percentage of 0%.

In order to predict a color obtained by overprint of inks of a plurality of colors, which include ink of a spot color, a colorimetric value for a color to be referred to at the time of prediction (hereinafter, the color will be referred to as a "reference color") is required. More specifically, for the reference color, required are: information (colorimetric values) on spectral reflectances of the maximum gradation value; information (colorimetric values) on spectral reflectances of the minimum gradation value; and information (colorimetric values) on spectral reflectances of at least one intermediate gradation value. Further, in each of the following embodiments, also for a prediction target color, required are: information (colorimetric values) on spectral reflectances of the maximum Gradation value; information (colorimetric values) on spectral reflectances of the minimum gradation value; and information (colorimetric values) on spectral reflectances of at least one intermediate gradation value. Incidentally, for the maximum gradation value and the minimum gradation value, the spectral reflectances can be acquired relatively easily. Note that the description will be given below on the assumption of a case in which the spectral reflectances are obtained in increments of 10 nm in a wavelength range of 380 nm to 730 nm (that is, a case in which one color is specified by 36 spectral reflectances). However, not only this but also, for example, to a case in which spectral reflectances with the number obtained by dividing a wavelength range including a range of 400 nm to 700 nm by unit wavelength ranges with an appropriate size, each of the embodiments (including modified examples) which will be described later can be applied.

The spectral reflectances of the maximum gradation value (that is, the spectral reflectances of the solid patch PA2) are obtained, for example, by performing colorimetry for a relevant color part included in color marks or printed matter. Further, the spectral reflectances of the maximum gradation value can also be replaced by spectral reflectances obtained by colorimetry of a color sample of the relevant color. This is because the color sample represents a color targeted when the relevant color is solidly applied.

The spectral reflectances of the minimum gradation value (that is, the spectral reflectances of the paper white patch PA1) is obtained, for example, by performing colorimetry for a non-print portion on the base material. Further, if the same sheet is used as the base material in printing, then the spectral reflectances of the minimum gradation value are constant irrespective of the ink color. Hence, even if the processes are performed for inks of a plurality of colors, as long as the same sheet is used, the spectral reflectances of the minimum gradation value need to be measured only once.

For the intermediate gradation value, accurate spectral reflectances cannot be obtained unless the CxF chart or the like actually printed on the base material is subjected to colorimetry. However, as mentioned above, spectral reflectances of a certain intermediate gradation value are sometimes obtained by the color marks or the like.

Embodiments of the present invention will be described below with reference to the accompanying drawings.

<1. First Embodiment>
<1.1 Overall Configuration of Printing System>

Figure 2:
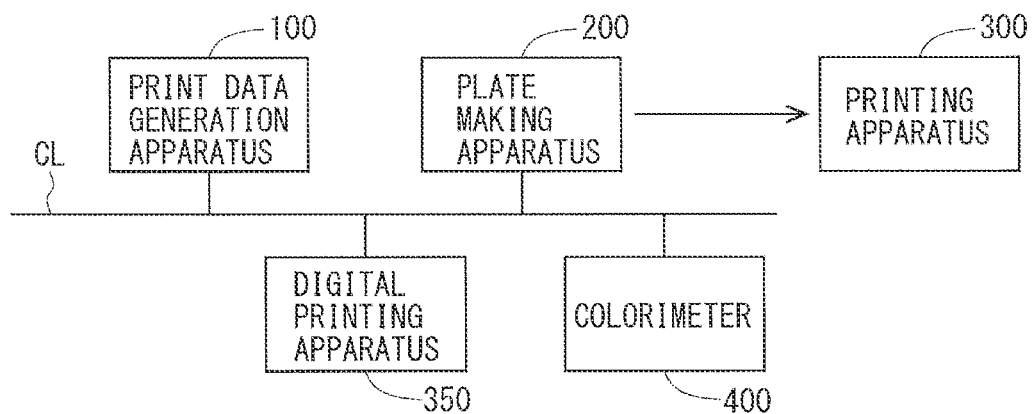
FIG. 2 is an overall configuration diagram of a printing system in a first embodiment of the present invention.

FIG. 2 an overall configuration diagram of a printing system in a first embodiment of the present invention. This printing system is composed of: a print data generation apparatus 100 configured to generate print data by implementing a variety of processes for submitted data such as a PDF file; a plate making apparatus 200 configured to make a printing plate on the basis of the print data; a printing apparatus 300 configured to perform printing using the printing plate made by the plate making apparatus 200; a digital printing apparatus 350 such as an inkjet printer/copier configured to perform printing on the basis of print data that is digital data without using the printing plate; and a colorimeter (for example, a spectral colorimeter) 400 configured to perform colorimetry. The print data generation apparatus 100, the plate making apparatus 200, the digital printing apparatus 350 and the colorimeter 400 are communicably interconnected by a communication line CL.

In the present embodiment, in the print data generation apparatus 100, a spectral reflectances prediction process for predicting spectral reflectances obtained by applying ink of a prediction target color (typically, ink of a spot color) on a base material is performed. In the spectral reflectances prediction process, at least one gradation value is designated as a prediction target gradation value, and prediction values of spectral reflectances of the prediction target gradation value for the prediction target color are obtained.

Further, the print data generation apparatus 100 performs an overprint prediction process for predicting a color obtained by overprinting inks of a plurality of colors (typically, predicting a color of a portion where a plurality of spot color inks are overprinted or a portion where a spot color ink and a process color ink are overprinted). In the overprint prediction process, results of the spectral reflect antes prediction process (that is, prediction values of spectral reflectances) are used according to needs. Moreover, the print data generation apparatus 100 performs a process for converting data, which is obtained by the overprint prediction process, into print data in format capable of printed output in the digital printing apparatus 350. Note that, as a specific method of the overprint prediction process, the above-mentioned Deshpande et al. method may be adopted, or another method may be adopted.

<1.2 Configuration of Print Data Generation Apparatus>

Figure 3:
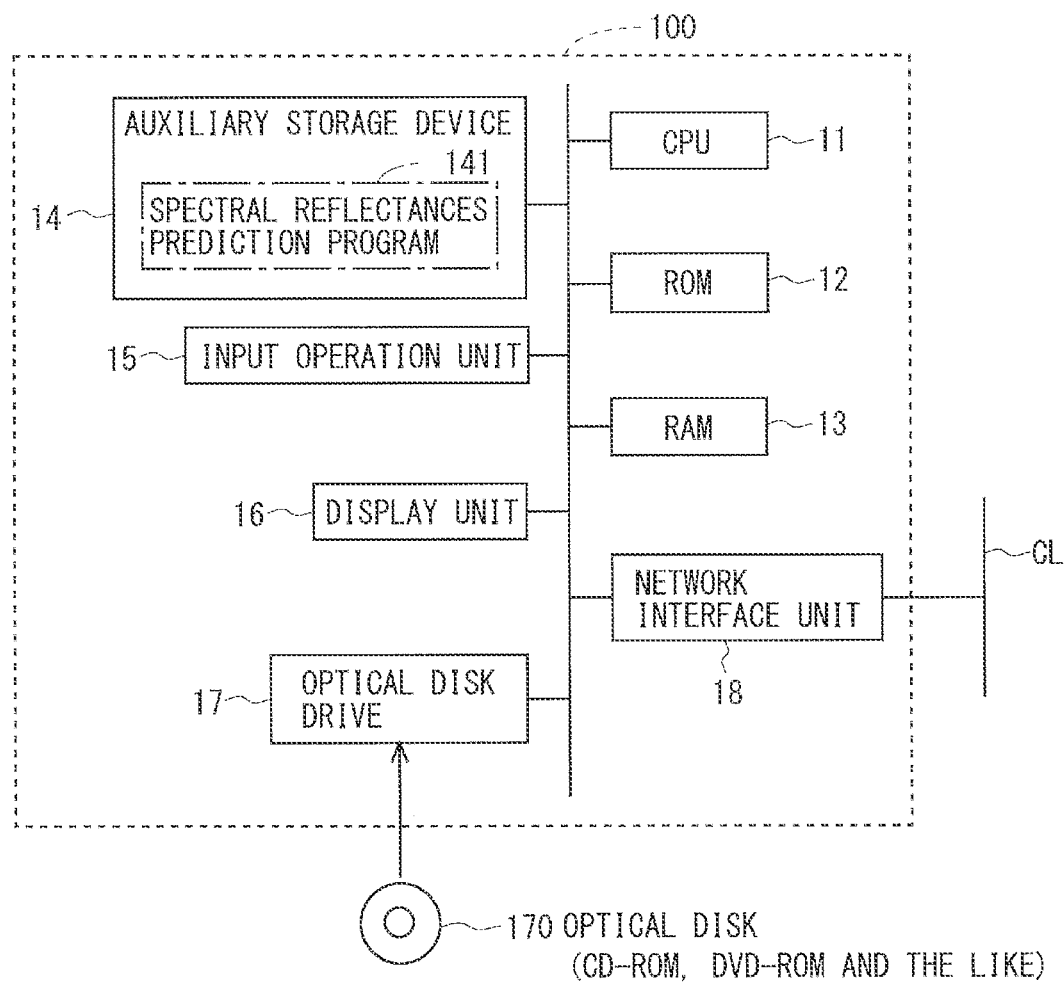
FIG. 3 is a hardware configuration diagram of print data generation apparatus in the first embodiment.

FIG. 3 is a diagram showing a hardware configuration of the print data generation apparatus 100 in the present embodiment. The print data generation apparatus 100 is implemented by a personal computer, and includes a CPU 11, a ROM 12, a RAM 13, an auxiliary storage device 14, an input operation unit 15 such as a keyboard, a display unit 16, an optical disk drive 17, and a network interface unit 18. The submitted data transmitted through the communication line CL is inputted into the print data generation apparatus 100 via the network interface unit 18. Print data generated by the print data generation apparatus 100 is sent to the digital printing apparatus 350 through the communication line CL via the network interface unit 18.

A spectral reflectances prediction program 141 for performing the spectral reflectances prediction process is stored in the auxiliary storage device 14. The spectral reflectances prediction program 141 is provided by being stored in a computer readable recording medium such as a CD-ROM or a DVD-ROM. That is, a user purchases, for example, an optical disk (CD-ROM, DVD-ROM, etc.) 170 as a recording medium for the spectral reflectances prediction program 141, mounts the optical disk 170 on the optical disk drive 17, reads the spectral reflectances prediction program 141 from the optical disk 170, and installs the read program in the auxiliary storage device 14. Alternatively, the spectral reflectances prediction program 141 sent through the communication line CL may be received by the network interface unit 18 and installed in the auxiliary storage device 14.

<1.3 Spectral Reflectances Prediction Method (Spectral Characteristics Prediction Method)>

A description will be given below of the spectral reflectances prediction process that achieves a spectral reflectances prediction method (spectral characteristics prediction method) according to the present embodiment. Note that this spectral reflectances prediction process is performed in such a manner that a spectral reflectances prediction program 141 executed by the print data generation apparatus 100.

Figure 4:
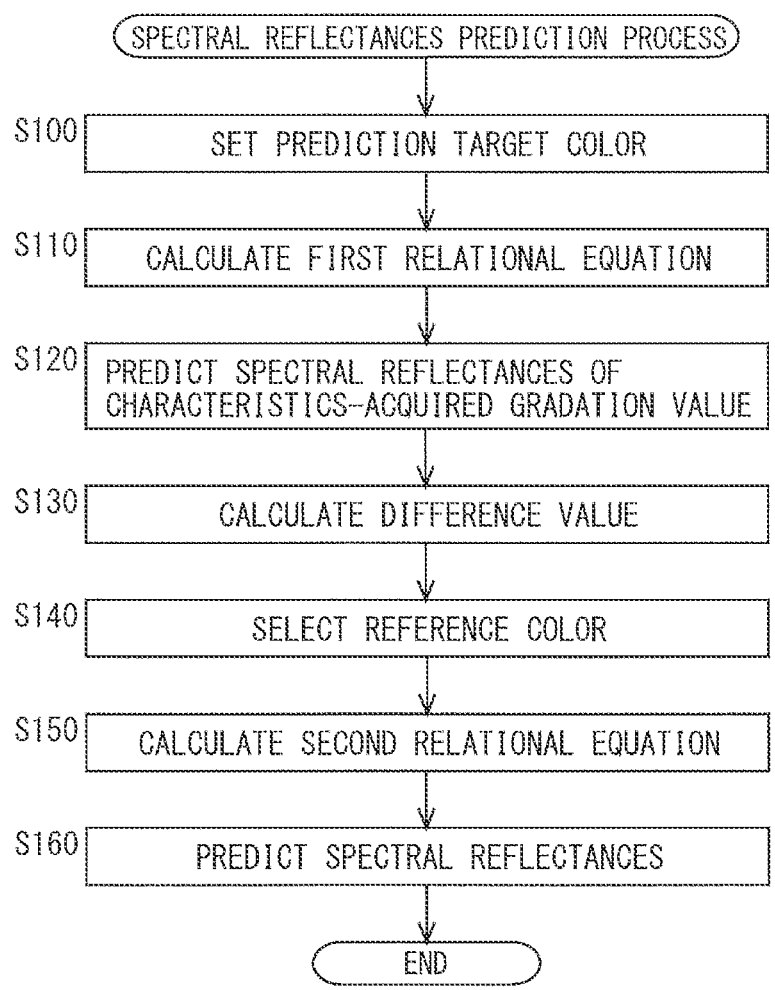
FIG. 4 is a flowchart illustrating a procedure of a spectral reflectances prediction process in the first embodiment.

FIG. 4 is a flowchart illustrating a procedure of the spectral reflectances prediction process in the present embodiment. Note that, until this spectral reflectances prediction process is executed, it is necessary to obtain the spectral reflectances of the maximum gradation value, the spectral reflectances of the minimum gradation value, and the spectral reflectances of at least one intermediate gradation value regarding each of the appropriate number of ink colors (hereinafter, referred to as "sample colors"). However, herein, it is assumed that, regarding each of the plurality of sample colors, spectral reflectances of all gradation values in increments of 0.1 from the minimum gradation value (gradation value of 0) to the maximum gradation value (gradation value of 1) are obtained. In order to achieve this, for example, it is sufficient if the printing of such a CHF chart as illustrated in FIG. 1 (which may be replaced by a simple CHF chart) and the colorimetry thereof are already performed for each of the sample colors. As such sample colors, for example, 32 spot colors are used. Note that the process colors may be included in the sample colors. A flow illustrated in FIG. 4 will be described below.

First, the prediction target color is set (Step S100) In the present embodiment, an ink color for which the spectral reflectances of the maximum gradation value, the spectral reflectances of the minimum gradation value, and the spectral reflectances of at least one intermediate gradation value are obtained is set as the prediction target color. In this regard, for example, the process of Step S100 may be achieved in such a manner that a user inputs information on the prediction target color on a predetermined screen, or the process of Step S100 may be achieved in such a manner that the spectral reflectances prediction program 141 reads a data file including information on the prediction target color. Note that, hereinafter, such an intermediate gradation value for which the spectral reflectances are obtained regarding the prediction target color will be referred to as a "characteristics-acquired gradation value." For example, if spectral reflectances of a gradation value of 0.3 and spectral reflectances of a gradation value of 0.5 are obtained regarding the prediction target color, then 0.3 and 0.5 are such characteristics-acquired gradation values.

Next, for each of the above-mentioned plurality of sample colors, a relational equation that represents a relationship between the spectral reflectances of the maximum gradation value and the spectral reflectances of the characteristics-acquired gradation value (hereinafter, this relational equation will be referred to as a "first relational equation") is obtained (Step S110). In this Step S110, for each of the sample colors, a number of relational equations equal to the number of the characteristics-acquired gradation values are obtained. When 0.3 and 0.5 are the characteristics-acquired gradation values as in the above-described example, two first relational equations are obtained for each sample color.

Figure 5:
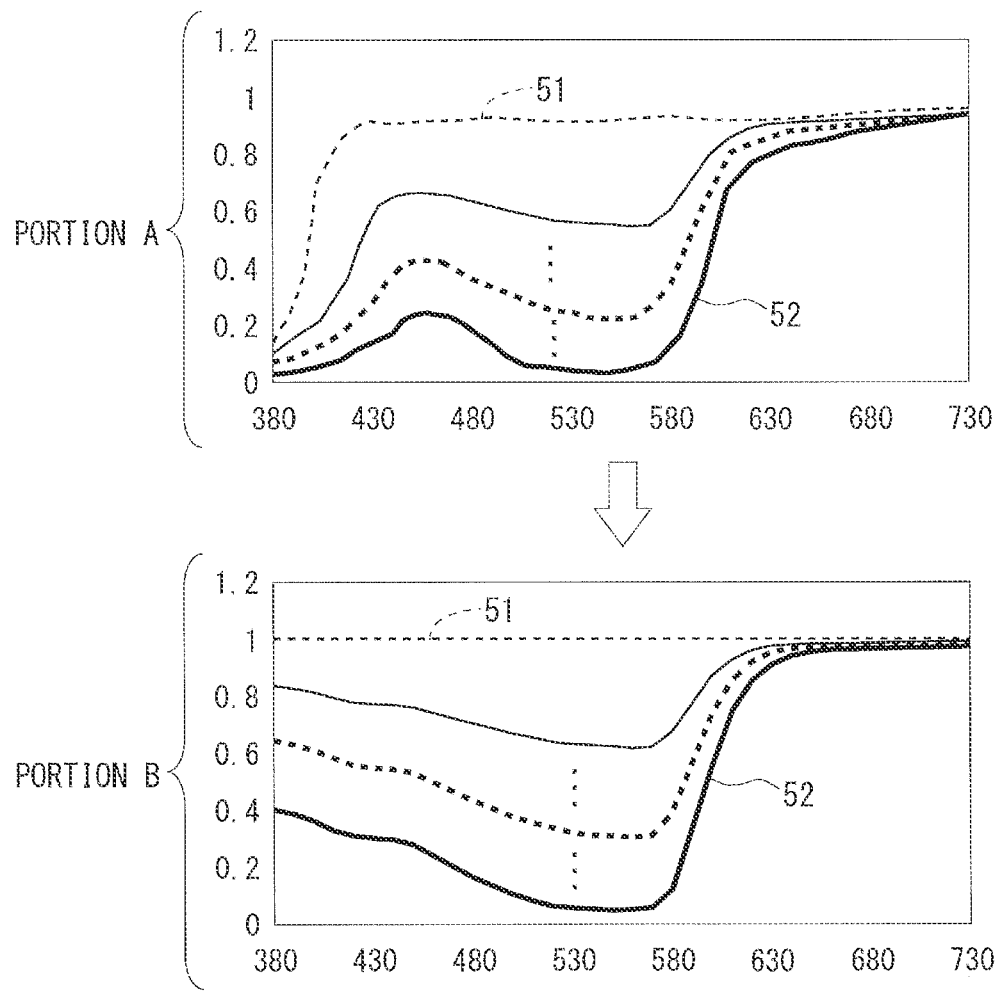
FIG. 5 is diagrams for explaining normalization when calculating a first relational equation in the first embodiment.

A detailed description will be given of how to obtain the first relational equation. As mentioned above, regarding the sample color, the calorimetric values (spectral reflectances) of all the gradation values in increments of 0.1 from the minimum gradation value (gradation value of 0) to the maximum gradation value (gradation value of 1) are obtained. That is, data corresponding to curves (curves which represent the spectral reflectances) as schematically illustrated in a portion A of FIG. 5 are obtained for all of eleven gradation values in increments of 0.1 from 0 to 1 (in FIG. 5, horizontal axes represent wavelength (unit: nm), and vertical axes represent reflectance). Note that the portion A in FIG. 5 illustrates only curves corresponding to four gradation values among the eleven gradation values (the same also applies to a portion B in FIG. 5). A curve denoted by reference symbol 51 is a curve for the minimum gradation value, and a curve denoted by reference symbol 52 is a curve for the maximum gradation value. Such data are subjected to normalization with the spectral reflectances of the minimum gradation value being taken as 1. Thus, data corresponding to curves (curves which represent the spectral reflectances) as schematically illustrated in a portion B in FIG. 5 are obtained. However, a straight line is obtained for the minimum gradation value taken as a reference of the normalization.

Figure 6:
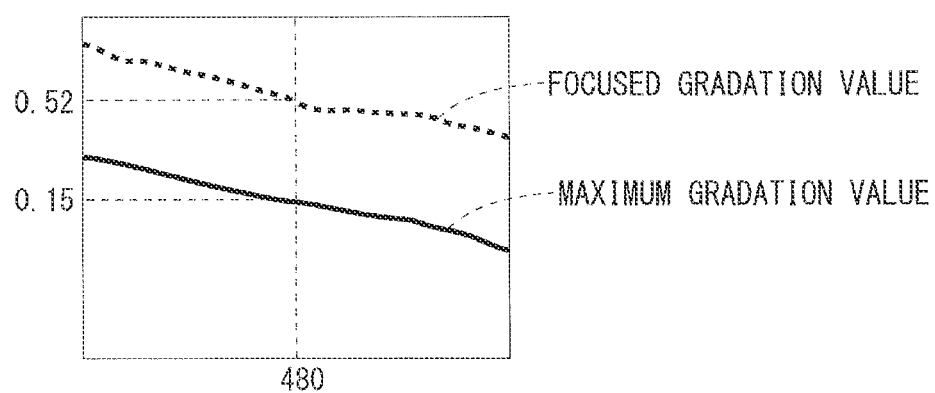
FIG. 6 is a diagram for explaining combination data in the first embodiment.
Figure 7:
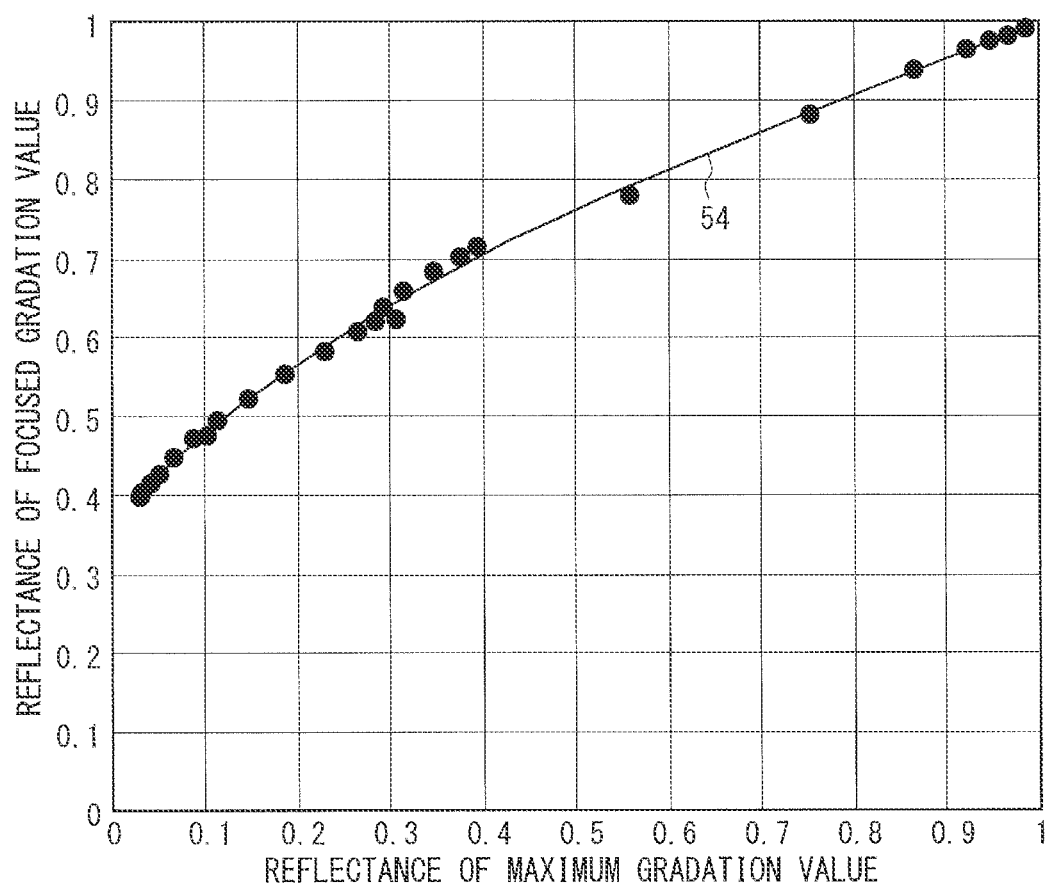
FIG. 7 is a diagram for explaining calculation of the first relational equation in the first embodiment.
Figure 8:
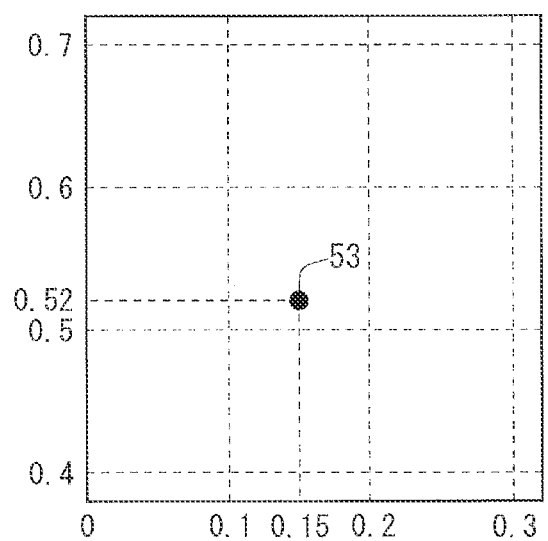
FIG. 8 is a diagram illustrating an example of one plot in the first embodiment.

Herein, we focus on one intermediate gradation value that is a characteristics-acquired gradation value from among nine intermediate gradation values. Hereinafter, this focused intermediate gradation value will be referred to as a "focused gradation value." Regarding such a Graph as illustrated in the portion B in FIG. 5, it is assumed that the curves for the maximum gradation value and the focused gradation value are as illustrated in FIG. 6 in the vicinity of a wavelength of 480 nm. In this case, the reflectance of the maximum gradation value is 0.15 and the reflectance of the focused gradation value is 0.52. In the present embodiment, such data obtained by combining the reflectance of the maximum gradation value and the reflectance of the focused gradation value with each other is treated as "combination data." As mentioned above, data of the spectral reflectances is composed of 36 reflectances. Therefore, 36 pieces of combination data of the reflectances (the reflectances after normalization) of the maximum gradation values and the reflectances (the reflectances after normalization) of the focused gradation values are obtained. As illustrated in FIG. 7, each of the combination data is represented as one plot on a graph in which a horizontal axis represents the reflectance of the maximum gradation value and a vertical axis represents the reflectance of the focused gradation value. Hereinafter, the graph will be referred to as a "relational graph" for convenience. For example, the combination data based on the data illustrated in FIG. 6 is represented, on the relational graph, as a plot denoted by reference numeral 53 in FIG. 8. In this manner, in the present embodiment, 36 plots are represented on the relational graph. The calculation of the first relational equation corresponds to obtaining a curve (for example, a curve denoted by reference numeral 54 in FIG. 7) that passes through positions as close to the positions of these 36 plots as possible.

Note that, in the example illustrated in the portion B in FIG. 5, the reflectances take minimum values in the vicinity of a wavelength of 560 nm, and reflectances of the same value appear at a wavelength larger than 560 nm and a wavelength smaller than 560 nm. Hence, for example, when the combination data are sequentially plotted on the relational graph in a descending order of the wavelengths, turning-back of a locus thereof occurs. However, as seen from FIG. 7, the relationship between the reflectance of the maximum gradation value and the reflectance of the focused gradation value is unchanged before and after the turning-back. From the above, it is conceivable that, if the sample color and the prediction target color are colors close to each other, the reflectances of the focused gradation value for the prediction target color can be accurately obtained from the reflectances of the maximum gradation value for the prediction target color, using the "relationship between the reflectances of the maximum gradation value and the reflectances of the focused gradation value" for the sample color.

In view of the above, in Step S110 in FIG. 4, on the basis of such 36 pieces of combination data as mentioned above, the first relational equation which represents the relationship between the spectral reflectances of the maximum gradation value and the spectral reflectances of the focused gradation value is obtained. The first relational equation is an approximate equation for obtaining approximate values of the spectral reflectances of the focused gradation value from the spectral reflectances of the maximum gradation value. Note that the first relational equation is obtained by a known method. For example, the first relational equation is obtained by solving simultaneous equations obtained from the 36 pieces of combination data by Gaussian elimination or Gauss-Jordan elimination.

In the present embodiment, a quintic equation is adopted as the first relational equation (the approximate equation). As an example, such a quintic equation as the following Equation (4) is obtained by the process in Step S110 in FIG. 4. Note that, regarding the following Equation (4), y is the reflectance of the focused gradation value (the characteristics-acquired gradation value), and x is the reflectance of the maximum gradation value.

$$y = -0.321x^5 + 0.7136x^4 - 0.1681x^3 - 0.6897x^2 + 1.0892x + 0.375 \quad (4)$$

Incidentally, a case is assumed in which the characteristics-acquired gradation value is not included in such gradation values for which the spectral reflectances are obtained regarding the sample color. Although the spectral reflectances of all the gradation values in increments of 0.1 from 0 to 1 are obtained regarding the sample color in the above-described example, it conceivable that the characteristics-acquired gradation value is 0.25. In such a case, in the present embodiment, after a quintic equation corresponding to the gradation value of 0.2 and a quintic equation corresponding to the Gradation value of 0.3 are obtained, a coefficient of a quintic equation corresponding to the gradation value of 0.25 is obtained by interpolation. Then, a quintic equation that has the coefficient obtained by the interpolation is adopted as the first relational equation.

After Step S110 is ended, the spectral reflectances of the maximum gradation value for the prediction target color are applied to the first relational equation for each of the plurality of sample colors, whereby the prediction values of the spectral reflectances of the characteristics-acquired gradation value for the prediction target color are obtained (Step S120). If 32 colors are prepared as the sample colors, then 32 prediction values are obtained per characteristics-acquired gradation value in Step S120.

Thereafter, for each of the plurality of sample colors, obtained is a difference value between the prediction values obtained in Step S120 and actual measurement values of the spectral reflectances of the characteristics-acquired gradation value for the prediction target color (Step S130). In the present embodiment, as the difference value, obtained is a square error between the prediction values obtained in Step S120 and the actual measurement values of the spectral reflectances of the characteristics-acquired gradation value for the prediction target color. How to obtain the square error will be described below.

Figures 9, 10:
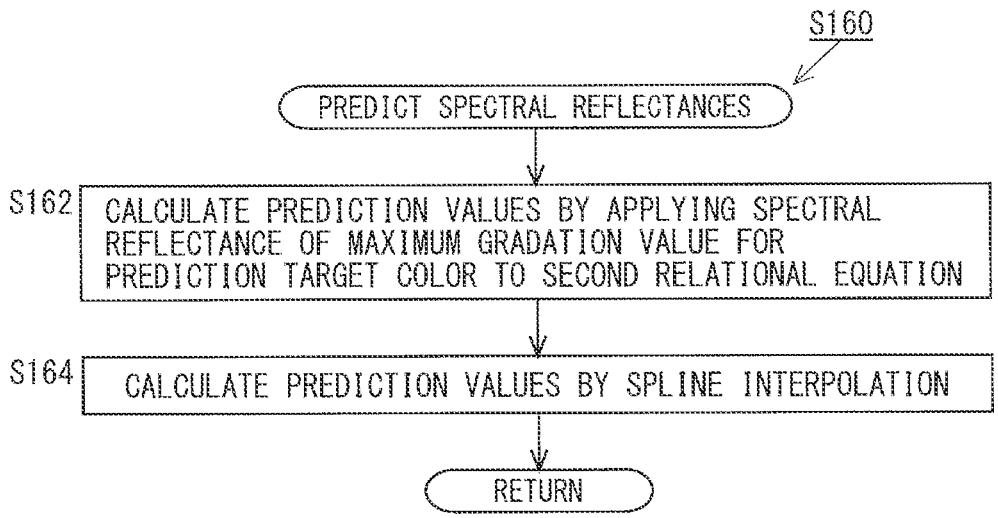
FIG. 9 is a table for explaining how to obtain a square error in the first embodiment.
FIG. 10 is a flowchart illustrating a procedure of Step S160 in a case in which prediction target gradation values include a gradation value other than a gradation value in which spectral reflectances regarding a reference color are obtained is the first embodiment.

Herein, a variable Ci (i is an integer of 1 or more) is used to distinguish the plurality of sample colors from one another, and prediction values of spectral reflectances (prediction values of 36 reflectances) obtained for the sample color Ci are represented as Vp(i)(1) to Vp(i)(36) (see FIG. 9). Moreover, actual measurement values of the spectral reflectances (actual measurement values of 36 reflectances) of the characteristics-acquired gradation value for the prediction target color are represented as Vr(1) to Vr(36). Then, a square error E(1) between prediction values obtained for a first sample color C1 and the actual measurement values for the prediction target color is obtained by the following Equation (5).

$$E(1) = \sum_{j=1}^{36} \{Vr(j) - Vp(1)(j)\}^2 \quad (5)$$

Likewise, a square error E(i) between prediction values obtained for an i-th sample color Ci and the actual measurement values for the prediction target color obtained by the following Equation (6). However, a weighting coefficient may be added for each wavelength.

$$E(i) = \sum_{j=1}^{36} \{Vr(j) - Vp(i)(j)\}^2 \quad (6)$$

Incidentally, in a case in which the number of characteristics-acquired gradation values is one (for example, in a case in which the gradation value of 0.5 is only the characteristics-acquired gradation value), the square error E(i) obtained in the above Equation (6) can be directly adopted as a difference value for the i-th sample color Ci.

In contrast, in a case in which the number of characteristics-acquired gradation values is 2 or more, the square error is obtained by the above Equation (6) for each of the characteristics-acquired gradation values, and for example, an average value of these square errors is adopted as a difference value. For example, if the number of characteristics-acquired gradation values is three, three square errors are obtained, and an average value of these three square errors is adopted as a difference value. Note that a weighted average value of the square errors may be adopted as a difference value in place of such a simple average value of the square errors.

After Step S130 is ended, a sample color from which a minimum difference value (square error) is obtained in Step S130 among the plurality of sample colors is selected as the reference color (Step S140). That is, in the present embodiment, a sample color for which the spectral reflectances of the characteristics-acquired gradation value for the prediction target color can be predicted with highest accuracy using the first relational equation among the plurality of sample colors is selected as the reference color.

Next, a relational equation which represents the relationship between the spectral reflectances of the maximum gradation value and the spectral reflectances of the prediction target gradation value for the reference color is obtained (Step S150). The relational equation will be hereinafter referred to as a "second relational equation." Note that, herein, it is assumed that eleven gradation values in 0.1 increments from the gradation value of 0 to the gradation value of 1 are the prediction target gradation values. A specific method for obtaining the second relational equation is the same as the method for obtaining the first relational equation. The second relational equation is obtained for each of the prediction target gradation values, and therefore, eleven second relational equations are obtained herein.

Finally, using the second relational equation, the prediction values of the spectral reflectances of the prediction target gradation value for the prediction target color are obtained (Step S160). Specifically, the spectral reflectances of the maximum gradation value for the prediction target color are applied to the second relational equation obtained in Step S150, whereby the prediction values of the spectral reflectances of the prediction target gradation value for the prediction target color are obtained. Herein, the number of prediction target gradation values is eleven, and therefore, the spectral reflectances of the maximum gradation value for the prediction target color are applied to the eleven second relational equations. Thus, for the prediction target color, the prediction values of the spectral reflectances of each of the eleven prediction target gradation values are obtained.

A more detailed description will be given of the process for obtaining the prediction values of the spectral reflectances (the process in Step S160). At the point of time when the process of Step S160 is started, the quintic equation, for example, such as the above Equation (4) is obtained as the second relational equation for each of the prediction target gradation values for the reference color. Moreover, as mentioned above, the data of the spectral reflectances is composed of 36 reflectances. Accordingly, in Step S160, for each prediction target gradation value, the 36 reflectances which are the data of the spectral reflectances of the maximum gradation values for the prediction target color are assigned one by one to the corresponding second relational equation (the relational equation which represents the relationship between the spectral reflectances of the maximum gradation value and the spectral reflectances of the relevant prediction target gradation value), whereby the 36 reflectances which serve as the data of the spectral reflectances of the relevant prediction target gradation value for the prediction target color are obtained. In the present embodiment, when the second relational equation is calculated, normalization is performed so that the spectral reflectances of the minimum gradation value are 1. Hence, the 36 reflectances obtained from the second relational equation are subjected to denormalization based on the actual spectral reflectances of the minimum gradation value. The denormalization is a process for returning normalized data to unnormalized data.

Note that, in the above-described example, the gradation values for which the spectral reflectances are obtained regarding the reference color and the prediction target gradation values coincide with each other. However, such a case is also assumed in which the prediction target gradation values include a gradation value other than the gradation values for which the spectral reflectances are obtained regarding the reference color. For the gradation value other than the gradation values for which the spectral reflectances are obtained regarding the reference color, spectral reflectances thereof cannot be directly obtained from the second relational equation. Accordingly, the spectral reflectances of such a gradation value are obtained by performing spline interpolation (for example, cubic spline interpolation) based on data of the spectral reflectances directly obtained from the second relational equations. In such a case, the above-described Step S160 is composed of Step S162 and Step S164 as illustrated in FIG. 10. In Step S162, the prediction values of the spectral reflectances of the gradation values for which the spectral reflectances are obtained regarding the reference color among the plurality of gradation values serving as the prediction target gradation values are obtained by applying the spectral reflectances of the maximum gradation values for the predict on target color to the corresponding second relational equations. Thereafter, in Step S169, the prediction values of the spectral reflectances of the gradation value for which the spectral reflectances are not obtained regarding the reference color among the plurality of gradation values serving as the prediction target gradation values are obtained by spline interpolation based on the prediction values obtained in Step S162. Note that, though linear interpolation can also be used in place of the spline interpolation, the prediction values are obtained more accurately by the spline interpolation than the linear interpolation.

In such a way as described above, the prediction values of the spectral reflectances of the prediction target gradation value for the prediction target color are obtained. Thus, the spectral reflectances prediction process is ended.

Note that, in the present embodiment, a prediction target color setting step is achieved by Step S100, a first relational equation calculation step is achieved by Step S110, a first prediction step is achieved by Step S120, a difference value calculation step is achieved by Step S130, a reference color selection step is achieved by Step S140, a second relational equation calculation step is achieved by Step S150, and a second prediction step is achieved by Step S160. Moreover, a second relational equation using step is achieved by Step S162, and an interpolation step is achieved by Step S164.

<1.4 Effect>

According to the present embodiment, the first relational equations which represent the relationships between the spectral reflectances of the maximum gradation values and the spectral reflectances of the characteristics-acquired gradation value (the intermediate gradation value for which the spectral reflectances are obtained regarding the prediction target color) are obtained for each of the sample colors, and using the first relational equations for respective sample colors, the prediction values of the spectral reflectances of the characteristics-acquired gradation value for the prediction target color are obtained. Then, the difference values between the prediction values and the actual measurement values are obtained, and a sample color for which the minimum difference value is obtained is selected as the reference color. The second relational equation that represents the relationship between the spectral reflectances of the maximum gradation value and the spectral reflectances of the prediction target gradation value for the reference color is obtained, and the spectral reflectance of the maximum gradation values for the prediction target color are applied to the second relational equation, whereby the spectral reflectances (prediction values) of the prediction target gradation value for the prediction target color are obtained. As above, the spectral reflectances are predicted for the prediction target color using, as the reference color, the color in which known spectral reflectances for the prediction target color can be predicted with highest accuracy. Accordingly, highly accurate prediction values are obtained. Thus, according to the present embodiment, in a case in which there is an intermediate gradation value for which the spectral reflectances are known regarding the prediction target color, high accuracy prediction of the spectral reflectances of the prediction target gradation values for the prediction target color is enabled using the information on the known spectral reflectances.

<1.5 Modified Examples>

Modified examples of the above-described first embodiment will be described. Note that the following first to fifth modified examples can also be applied to second and third embodiments which will be described later.

<1.5.1 First Modified Example>

In the above-described first embodiment, the reference color is selected (Step S140 in FIG. 4) from among the plurality of sample colors on the basis of the square error between the prediction values and the actual measurement values. However, the present invention is not limited to this, and the reference color can also be selected on the basis of the color difference. This will be described below.

In the present modified example, in Step S130 in FIG. 4, obtained is a color difference based on the prediction values obtained in Step S120 and the actual measurement values of the spectral reflectances of the characteristics-acquired gradation value for the prediction target color. Then, in Step S140 in FIG. 4, a sample color from which a minimum color difference is obtained is selected as the reference color.

Note that color difference based on certain prediction values and the actual measurement values is obtained, for example, as follows. First, for the prediction values and the actual measurement values, respectively, tristimulus values X, Y, and Z are obtained by a predetermined calculation formula. Next, for the prediction values and the actual measurement values, respectively, CIELAB values (L* value, a* value, and b* value) are obtained from the tristimulus values X, Y, and Z by a predetermined conversion formula. Next, for each of the L value, the a* value, and the b* value, a difference between the prediction values and the actual measurement values is obtained. A value (a positive value) of a square root of a sum of squares of three differences thus obtained is a color difference.

<1.5.2 Second Modified Example>

In the above-described first embodiment, quintic equations are adopted as the relational equations (the first relational equation and the second relational equation). However, the order of the relational equations is not limited to five. An n-order equation in which n is an integer of 2 or more may be adopted as such a relational equation.

In this regard, relational equations having different orders may be used for respective colors. For example, for a color with a narrow numerical range of the spectral reflectances of the maximum gradation value, if the order of the relational equation is large, overfitting may be caused and approximation accuracy may deteriorate. Accordingly, for such a color, the order of the relational equation is lowered, whereby it is possible to suppress the deterioration of the approximation accuracy caused by the overfitting.

<1.5.3 Third Modified Example>

Moreover, as the relational equations (the first relational equation and the second relational equation), equations represented using a power function may be adopted. In this case, for example, values of variables A and B in the following Equation (7) are obtained on the basis of the above-mentioned combination data (data represented as a plot on the relational graph). Then, an equation which reflects the values of the variables A and B is used as the relational equation. Note that, in a case in which the first relational equation is represented by the following Equation (7), y is a reflectance of the characteristics-acquired gradation value, and x is a reflectance of the maximum gradation value. Moreover, in a case in which the second relational equation is represented by the following Equation (7), y is a reflectance of the prediction target gradation value, and x is a reflectance of the maximum gradation value.

$$y = Ax^B \qquad (7)$$

<1.5.4 Fourth Modified Example>

In the above-described first embodiment, the process for predicting the spectral reflectances as spectral characteristics is performed. However, the present invention is not limited to this, and a process for predicting spectral characteristics other than the spectral reflectances may be performed. Examples of the spectral characteristics other than the spectral reflectances include spectral absorption factors (values obtained by subtracting respective spectral reflectances from one) and spectral absorption coefficients α obtained from the following Equation (8). When $R_0$ is the reflectance of paper white (minimum gradation value) at a certain wavelength, R is the reflectance of the relevant Gradation value, and x is a thickness of the ink, the spectral absorption coefficient α is represented by the following Equation (8) when multiple reflection is not taken into account.

$$\alpha = -(1/(2x)) \cdot \ln(R/R_0) \qquad (8)$$

<1.5.5 Fifth Modified Example>

In the above-described first embodiment, as the first relational equation, an equation is adopted, which represents the relationship between the spectral reflectances of the maximum gradation value and the spectral reflectances of the characteristics-acquired gradation value. However, the relationship represented by the first relational equation is not limited to this. For example, an equation that represents a relationship between the spectral absorption factors of the maximum gradation value and the spectral absorption factors of the characteristics-acquired gradation value, an equation that represents a relationship between the spectral reflectances of the maximum gradation value and the spectral absorption factors of the characteristics-acquired gradation value, or the like can be adopted as the first relational equation. Likewise, an equation which represents a relationship between the spectral absorption factors of the maximum gradation value and the spectral absorption factors of the prediction target gradation value for the reference color, an equation that represents a relationship between the spectral reflectances of the maximum gradation value and the spectral absorption factors of the prediction target gradation value for the reference color, or the like can also be adopted as the second relational equation.

<2. Second Embodiment>

<2.1 Preliminary Study>

Figure 11:
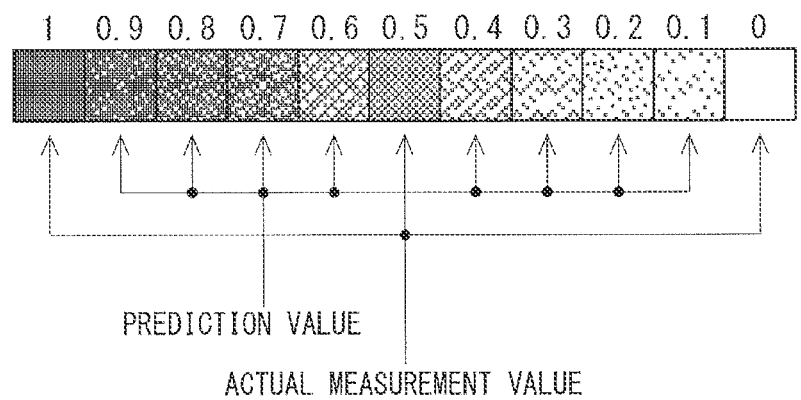
FIG. 11 is a diagram for explaining an occurrence of a tone jump in a vicinity of a characteristics-acquired gradation value.

In the above-described first embodiment, the sample color for which the spectral reflectances of the characteristics-acquired gradation value for the prediction target color can be predicted with highest accuracy using the first relational equation based on the characteristics thereof is selected, as the reference color, from among the plurality of sample colors, and the spectral reflectances of the prediction target gradation value for the prediction target color are predicted using the second relational equation based on the characteristics of the reference color. With such a configuration, some error occurs between the prediction values and the actual measurement values regarding the characteristics-acquired gradation value. For example, in a case in which eleven gradation values in increments of 0.1 from the gradation value of 0 to the gradation value of 1 are the prediction target gradation values, and only the gradation value of 0.5 is the characteristics-acquired gradation value, the spectral reflectances of the eleven gradation values (prediction target gradation values) are predicted using the second relational equations based on the characteristics of the reference color. In this case, some error occurs between the prediction values and the actual measurement values regarding the gradation value of 0.5. Herein, if the actual measurement values are adopted for the gradation value of 0.5 in order to set such an error for the gradation value of 0.5 to 0, then as seen from FIG. 11, a tone jump occurs in the vicinity of the Gradation value of 0.5.

Figure 12:
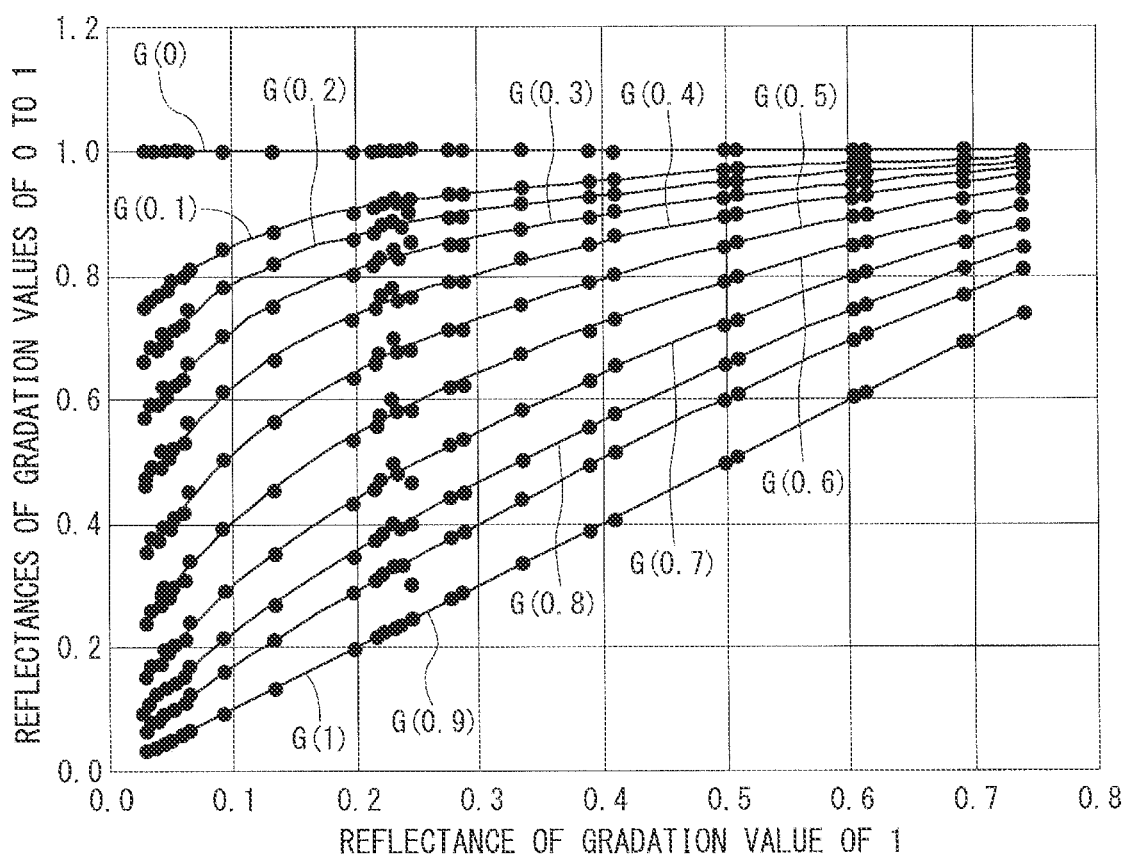
FIG. 12 is a diagram for explaining that an error occurs between prediction values and actual measurement values regarding spectral reflectances of the characteristics-acquired gradation value.

In the above-described example, if the spectral reflectances of the above-described eleven gradation values are known regarding the reference color, then using eleven second relational equations represented by lines (curves or straight lines) denoted by reference symbols G(z) (z is values in increments of 0.1 from 0 to 1) in FIG. 12, spectral reflectances of eleven gradation values (prediction target gradation values) for the prediction target color are predicted. Note that it is assumed that the spectral reflectances are normalized with the spectral reflectances of the minimum gradation value being taken as 1. In an example illustrated in FIG. 12, the spectral reflectances of the maximum gradation value and the spectral reflectances of the minimum gradation value serve as references. Therefore, when the spectral reflectances for the prediction target color are predicted using the second relational equation based on the characteristics of the reference color, such an error between the prediction values and the actual measurement values is 0 for each of the maximum gradation value and the minimum gradation value. However, the characteristics of the reference color and the characteristics of the prediction target color do not completely coincide with each other, and accordingly, an error occurs between the prediction values and the actual measurement values for the spectral reflectances of the characteristics-acquired gradation value. Accordingly, in the present embodiment, as will be described later, the spectral reflectances of the characteristics-acquired gradation value are included in the reference when creating the second relational equation.

<2.2 Configuration and Spectral Reflectances Prediction Method (Spectral Characteristics Prediction Method)>

An overall configuration of a printing system and a configuration of a print data generation apparatus are similar to those (see FIG. 2 and FIG. 3) of the above-described first embodiment, and accordingly, a description thereof will be omitted.

A procedure of a spectral reflectances prediction process that achieves a spectral reflectances prediction method (spectral characteristics prediction method) according to the present embodiment is schematically similar to that of the above-described first embodiment (see FIG. 4). However, a detailed method of calculating the second relational equation in Step S150 in FIG. 4 is different from that in the above-described first embodiment. This will be described below.

Figure 13:
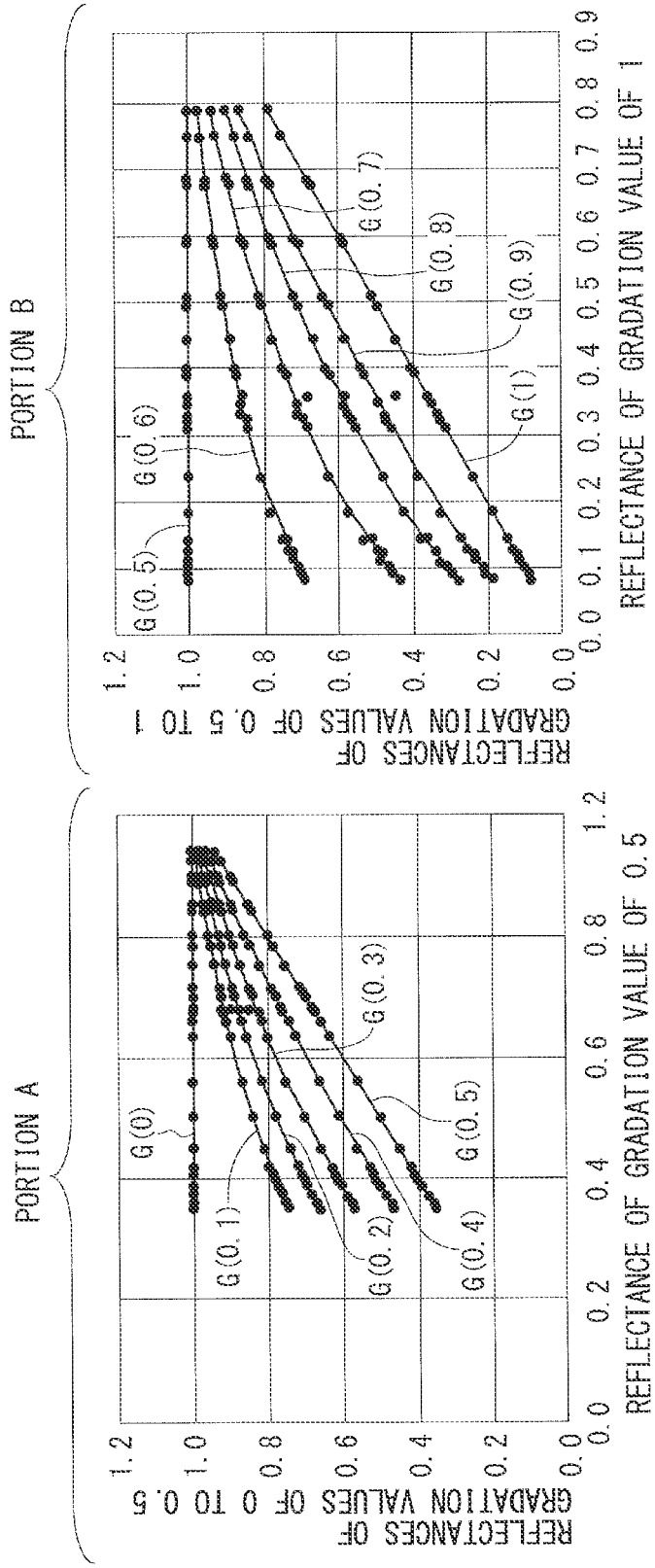
FIG. 13 is diagrams for explaining calculation of second relational equations in a second embodiment of the present invention.

In the present embodiment, in Step S150, the second relational equation is calculated while including the spectral reflectances or the characteristics-acquired gradation value in the reference. For example, in a case in which eleven gradation values in increments of 0.1 from the minimum gradation value (gradation value of 0) to the maximum gradation value (gradation value of 1) are the prediction target gradation values, the spectral reflectances of these eleven gradation values are obtained regarding the reference color, and only the gradation value of 0.5 is the characteristics-acquired gradation value, then a reference when creating a equation is differentiated between second relational equations corresponding to prediction target gradation values with gradation values of 0.5 or more and second relational equations corresponding to prediction target gradation values with gradation values of 0.5 or less. Specifically, each of the second relational equations corresponding to the prediction target gradation values of 0 or more and 0.5 or less is created with the spectral reflectances of the gradation value of 0.5 being taken as a first reference and with the spectral reflectances of the gradation value of 0 being taken as a second reference (see a portion A in FIG. 13), and each of the second relational equations corresponding to the prediction target gradation values of 0.5 or more and 1 or less is created with the spectral reflectances of the gradation value of 1 being taken as the first reference and with the spectral reflectances of the gradation value of 0.5 being taken as the second reference (see a portion B in FIG. 13). Note that, as the second relational equation for predicting the spectral reflectances of the gradation value of 0.5 for the prediction target color, a second relational equation created with the spectral reflectances of the gradation value of 0.5 being taken as the first reference and with the spectral reflectances of the gradation value of 0 being taken as the second reference may be adopted, or a second relational equation created with the spectral reflectances of the gradation value of 1 being taken as the first reference and with the spectral reflectances of the gradation value of 0.5 being taken as the second reference may be adopted. Moreover, the gradation value of 0.5 is the characteristics-acquired gradation value, and therefore, for the spectral reflectances of the gradation value of 0.5 for the prediction target color, actual measurement values may be directly applied thereto without using the second relational equation. Also for the spectral reflectances of the maximum gradation value (gradation value of 1) and the minimum gradation value (gradation value of 0) for the prediction target color, actual measurement values can also be directly applied thereto without using the second relational equations.

In the above-described example, the second relational equation is obtained as follows in Step S150. Hereinafter, the gradation value as a target for which spectral reflectances are to be obtained by the second relational equation will be referred to as a "process target gradation value." The gradation value for which the spectral reflectances are obtained regarding the reference color or the characteristics-acquired gradation value becomes the process target gradation value. For example, an equation that represents a relationship between the spectral reflectances of the gradation value of 1 and spectral reflectances of a gradation value of 0.7 with the spectral reflectances of the gradation value of 1 being taken as the first reference and with the spectral reflectances of the gradation value of 0.5 being taken as the second reference is obtained as a second relational equation for obtaining the spectral reflectances of the gradation value of 0.7 for the prediction target color. Moreover, for example, an equation that represents a relationship between the spectral reflectances of the gradation value of 0.5 and spectral reflectances of a gradation value of 0.2 with the spectral reflectances of the gradation value of 0.5 being taken as the first reference and with the spectral reflectances of the gradation value of 0 being taken as the second reference is obtained as a second relational equation for obtaining the spectral reflectances of the gradation value of 0.2 for the prediction target color.

As described above, in a case in which the number of characteristics-acquired gradation values is one, then in Step S150, regarding the process target gradation value between the maximum gradation value and the characteristics-acquired gradation value, the equation that represents the relationship between the spectral reflectances of the maximum gradation value and the spectral reflectances of the process target gradation value with the spectral reflectances of the maximum gradation value being taken as the first reference and with the spectral reflectances of the characteristics-acquired gradation value being taken as the second reference is obtained as the second relational equation; and regarding the process target gradation value between the characteristics-acquired gradation value and the minimum gradation value, the equation that represents the relationship between the spectral reflectances of the characteristics-acquired gradation value and the spectral reflectances of the process target gradation value with the spectral reflectances of the characteristics-acquired gradation value being taken as the first reference and with the spectral reflectances of the minimum gradation value being taken as the second reference is obtained as the second relational equation.

In the above-described example, only the gradation value of 0.5 is the characteristics-acquired gradation value. That is, the number of characteristics-acquired gradation values is one. In a case in which the number of characteristics-acquired gradation values is 2 or more, the second relational equation is obtained as follows.

First, a description will be given of the case in which the number of characteristics-acquired gradation values is two. Herein, we focus on a case in which "eleven gradation values in increments of 0.1 from the minimum gradation value (gradation value of 0) to the maximum gradation value (gradation value of 1) are prediction target gradation values, spectral reflectances of these eleven gradation values are obtained regarding a reference color, and a gradation value of 0.3 and a gradation value of 0.5 are characteristics-acquired gradation values." For this case, the second relational equations are obtained as follows in Step S150. For example, an equation that represents a relationship between the spectral reflectances of the gradation value of 1 and the spectral reflectances of the gradation value of 0.7 with the spectral reflectances of the gradation value of 1 being taken as the first reference and with the spectral reflectances of the gradation value of 0.5 being taken as the second reference is obtained as a second relational equation for obtaining the spectral reflectances of the gradation value of 0.7 for the prediction target color. Moreover, for example, an equation that represents a relationship between the spectral reflectances the gradation value of 0.5 and spectral reflectances of a gradation value of 0.4 with the spectral reflectances of the gradation value of 0.5 being taken as the first reference and with the spectral reflectances of the gradation value of 0.3 being taken as the second reference is obtained as a second relational equation for obtaining the spectral reflectances of the gradation value of 0.4 for the prediction target color. Moreover, for example, an equation that represents a relationship between the spectral reflectances of the gradation value of 0.3 and spectral reflectances of a gradation value of 0.1 with the spectral reflectances of the gradation value of 0.3 being taken as the first reference and with the spectral reflectances of the gradation value of 0 being taken as the second reference is obtained as a second relational equation for obtaining the spectral reflectances of the gradation value of 0.1 for the prediction target color.

As described above, in a case in which the first gradation value (0.5 in the above-described case) and the second gradation value (0.3 in the above-described case) smaller than the first gradation value are the characteristics-acquired gradation values, then in Step S150, regarding the process target gradation value between the maximum gradation value and the first gradation value, the equation that represents the relationship between the spectral reflectances of the maximum gradation value and the spectral reflectances of the process target gradation value with the spectral reflectances of the maximum gradation value being taken as the first reference and the spectral reflectances of the first gradation value being taken as the second reference is obtained as the second relational equation; regarding the process target gradation value between the first gradation value and the second gradation value, the equation that represents the relationship between the spectral reflectances of the first gradation value and the spectral reflectances of the process target gradation value with the spectral reflectances of the first gradation value being taken as the first reference and with the spectral reflectances of the second gradation value being taken as the second reference is obtained as the second relational equation; and regarding the process target gradation value between the second gradation value and the minimum gradation value, the equation that represents the relationship between the spectral reflectances of the second gradation value and the spectral reflectances of the process target gradation value with the spectral reflectances of the second gradation value being taken as the first reference and with the spectral reflectances of the minimum gradation value being taken as the second reference is obtained as the second relational equation.

Next, a description will be given of the case in which the number of characteristics-acquired gradation values is 3 or more. Herein, we focus on a case in which "eleven gradation values in increments of 0.1 from the minimum gradation value (gradation value of 0) to the maximum gradation value (gradation value of 1) are prediction target gradation values, spectral reflectances of these eleven gradation values are obtained regarding a reference color, and a gradation value of 0.3, a gradation value of 0.5, and a gradation value of 0.7 are characteristics-acquired gradation values." For this case, the second relational equations are obtained as follows in Step S150. For example, an equation that represents a relationship between the spectral reflectances of the gradation value of 1 and spectral reflectances of a gradation value of 0.9 with the spectral reflectances of the gradation value of 1 being taken as the first reference and with the spectral reflectances of the gradation value of 0.7 being taken as the second reference is obtained as a second relational equation for obtaining the spectral reflectances of the gradation value of 0.9 for the prediction target color. Moreover, for example, an equation that represents a relationship between the spectral reflectances of the gradation value of 0.7 and spectral reflectances of a gradation value of 0.6 with the spectral reflectances of the gradation value of 0.7 being taken as the first reference and with the spectral reflectances of the gradation value of 0.5 being taken as the second reference is obtained as a second relational equation for obtaining the spectral reflectances of the gradation value of 0.6 for the prediction target color. Moreover, for example, an equation that represents a relationship between the spectral reflectances of the gradation value of 0.5 and spectral reflectances of a gradation value of 0.4 with the spectral reflectances of the gradation value of 0.5 being taken as the first reference and with the spectral reflectances of the gradation value of 0.3 being taken as the second reference is obtained as a second relational equation for obtaining the spectral reflectances of the gradation value of 0.4 for the prediction target color. Moreover, for example, an equation that represents a relationship between the spectral reflectances of the gradation value of 0.3 and spectral reflectances of a gradation value of 0.1 with the spectral reflectances of the gradation value of 0.3 being taken as the first reference and with the spectral reflectances of the gradation value of 0 being taken as the second reference is obtained as a second relational equation for obtaining the spectral reflectances of the gradation value of 0.1 for the prediction target color.

As described above, in a case in which such m pieces of gradation values from the first Gradation value to an m-th gradation value with m being an integer of 3 or more are the characteristics-acquired gradation values, and such a k-th gradation value is larger than a (k+1)-th gradation value with k being an integer of 1 or more and (m−1) or less, then in Step S150, regarding the process target gradation value between the maximum gradation value and the first gradation value, the equation that represents the relationship between the spectral reflectances of the maximum gradation value and the spectral reflectances of the process target gradation value with the spectral reflectances of the maximum gradation value being taken as the first reference and with the spectral reflectances of the first gradation value being taken as the second reference is obtained as the second relational equation; regarding the process target gradation value between the k-th gradation value and the (k+1)-th gradation value, the equation that represents the relationship between the spectral reflectances of the k-th gradation value and the spectral reflectances of the process target gradation value with the spectral reflectances of the k-th gradation value being taken as the first reference and with the spectral reflectances of the (k+1)-th gradation value being taken as the second reference is obtained as the second relational equation; and regarding the process target gradation value between the m-th gradation value and the minimum gradation value, the equation that represents the relationship between the spectral reflectances of the m-th gradation value and the spectral reflectances of the process target gradation value with the spectral reflectances of the m-th gradation value being taken as the first reference and the spectral reflectances of the minimum gradation value being taken as the second reference is obtained as the second relational equation.

Herein, concerning the present embodiment, we focus on the case in which the prediction target gradation values include the gradation value other than the gradation values for which the spectral reflectances are obtained regarding the reference color. In this case, for example, if only the gradation value of 0.5 is the characteristics-acquired gradation value, then prediction values of the spectral reflectances of the gradation value for which the spectral reflectances are obtained regarding the reference color among the prediction target gradation values between the maximum gradation value and the characteristics-acquired gradation value are obtained by applying the spectral reflectances of the maximum gradation value for the prediction target color to the corresponding second relational equation; and prediction values of the spectral reflectances of the gradation value for which the spectral reflectances are obtained regarding the reference color among the prediction target gradation values between the characteristics-acquired gradation value and the minimum gradation value are obtained by applying the spectral reflectances of the characteristics-acquired gradation value for the prediction target color to the corresponding second relational equation. That is, with the maximum gradation value or the characteristics-acquired gradation value being taken as a reference gradation value, the prediction values of the spectral reflectances of the gradation value for which the spectral reflectances are obtained regarding the reference color among two or more prediction target gradation values are obtained by applying the spectral reflectances of the reference gradation value for the prediction target color to the corresponding second relational equation. In this manner, in the present embodiment, in Step S162 in FIG. 10, the prediction values of the spectral reflectances are calculated by applying, to the second relational equation, the spectral reflectances of the maximum gradation value or the characteristics-acquired gradation value for the prediction target color. Then, in Step S164 in FIG. 10, the prediction values of the spectral reflectances of the gradation value for which the spectral reflectances are not obtained regarding the reference color among the prediction target gradation values are obtained by the spline interpolation (for example, cubic spline interpolation) based on the prediction values obtained in Step S162. At this time, the prediction values of the spectral reflectances of the prediction target gradation value between the maximum gradation value and the characteristics-acquired gradation value are obtained not by performing spline interpolation based on prediction values for only three or more gradation values between the maximum gradation value and the characteristics-acquired gradation value, but by performing spline interpolation based on prediction values for three or more gradation values including a gradation value between the maximum gradation value and the characteristics-acquired gradation value and a gradation value between the characteristics-acquired gradation value and the minimum gradation value. The same also applies to the prediction values of the spectral reflectances of the prediction target gradation values between the characteristics-acquired gradation value and the minimum gradation value. Note that, though linear interpolation can also be used in place of the spline interpolation, the prediction values are obtained more accurately by the spline interpolation than the linear interpolation.

<2.3 Effect>

Figure 14:
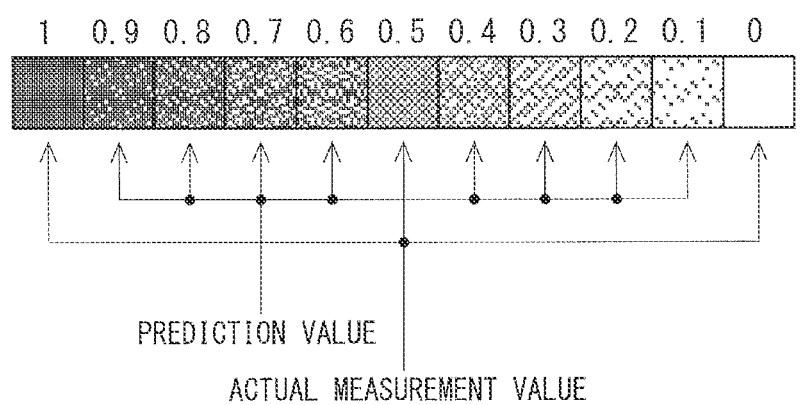
FIG. 14 is a diagram for explaining an effect in the second embodiment.

According to the present embodiment, the second relational equations for predicting the spectral reflectances of any prediction target gradation values are created with the characteristics-acquired gradation value being taken as a reference (first reference or second reference). Therefore, the prediction values of the spectral reflectances of the characteristics-acquired gradation value for the prediction target color become equal to actual measurement values thereof. Thus, the prediction accuracy of the spectral reflectances improves also for the gradation value between the maximum gradation value and the maximum characteristics-acquired gradation value, the gradation value between two characteristics-acquired gradation values, and the gradation value between the minimum characteristics-acquired gradation value and the minimum gradation value. From the above, it will be possible to predict the spectral reflectances of the respective gradation values from the minimum gradation value to the maximum gradation value so that such a smooth density change as schematically illustrated in FIG. 14 is obtained, and the tone jump is suppressed from occurring. Thus, it will be possible to predict the spectral reflectance of the prediction target gradation value for the prediction target color with higher accuracy than in the above-described first embodiment.

Figure 15:
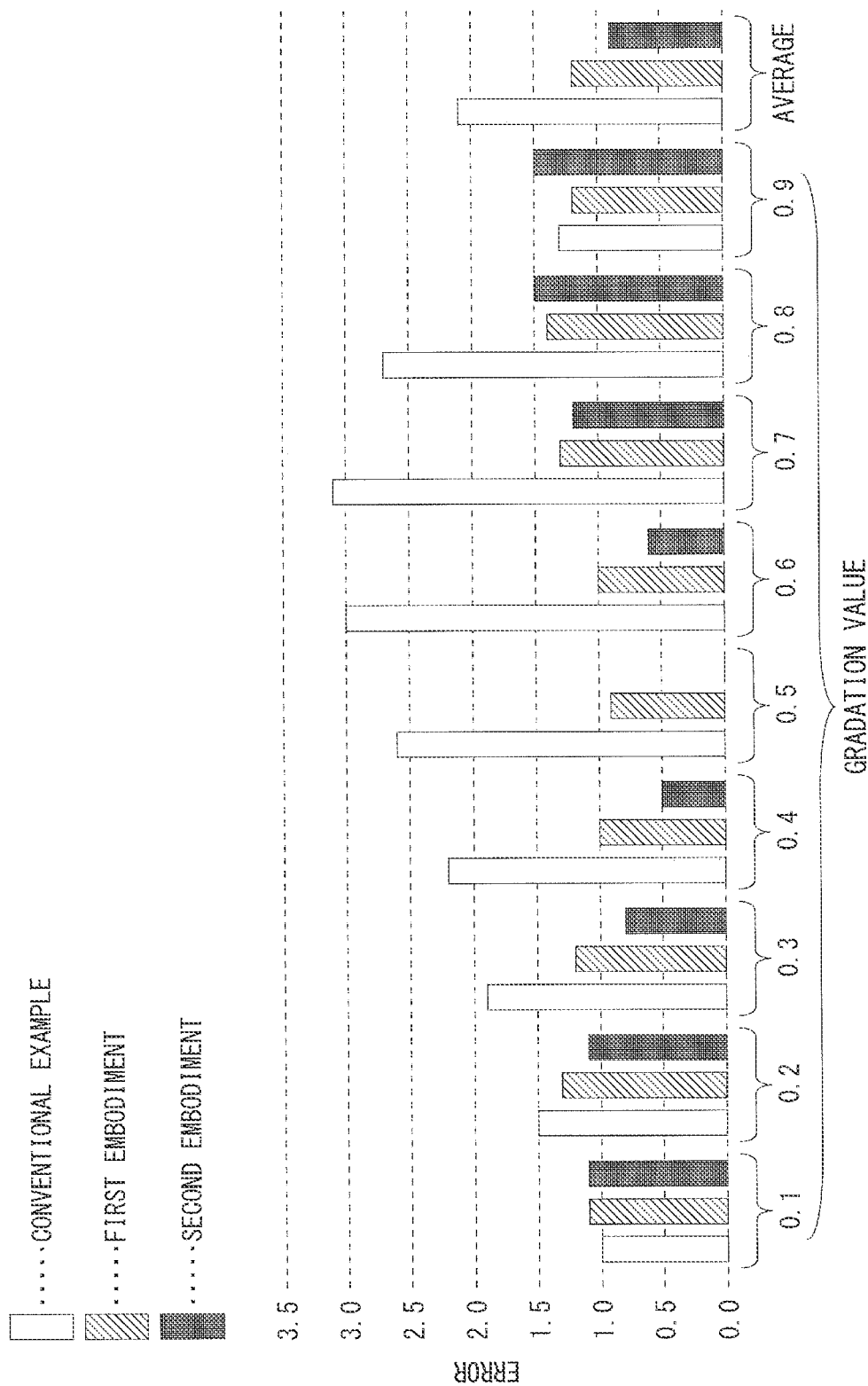
FIG. 15 is a graph for explaining ac effect in the second embodiment.

FIG. 15 shows results of a prediction test for 25 colors in a case in which only the gradation value of 0.5 is the characteristics-acquired gradation value. From FIG. 15, it is seen that the method of the above-described first embodiment significantly increases the overall prediction accuracy as compared with the conventional method. Moreover, from FIG. 15, it is seen that the method of the second embodiment significantly increases the prediction accuracy of the special reflectances of the gradation values in the vicinity of the characteristics-acquired gradation value as compared with the method of the above-described first embodiment.

<3. Third Embodiment>

<3.1 Outline>

Figure 16:
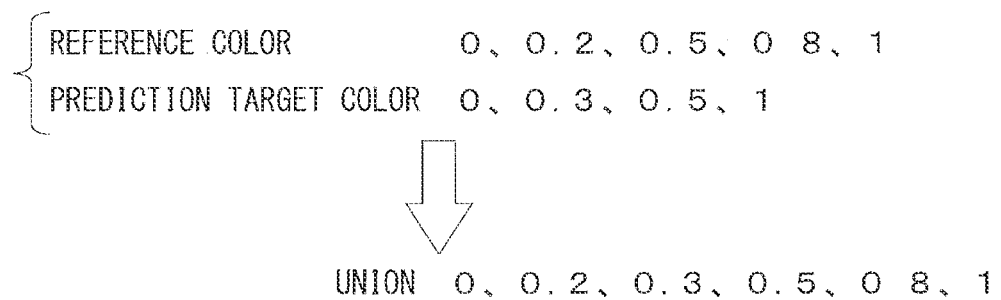
FIG. 16 is a diagram for explaining unions in a third embodiment of the present invention.

In the present embodiment, in a spectral reflectances prediction process, after a reference color is selected, obtained is a union of gradation values for which spectral reflectances are obtained regarding the reference color and gradation values for which spectral reflectances are obtained regarding a prediction target color. For example, if the gradation values for which the spectral reflectances are obtained regarding the reference color are 0, 0.2, 0.5, 0.8, and 1, and the gradation values for which the spectral reflectances are obtained regarding the prediction target color are 0, 0.3, 0.5, and 1, then the union is 0, 0.2, 0.3, 0.5, 0.8, and 1 (see FIG. 16). For a prediction target gradation value which is included in the union, prediction values of the spectral reflectances are obtained by the second relational equation, and for a prediction target gradation value which is not included in the union, prediction values of the spectral reflectances are obtained by spline interpolation (for example, cubic spline interpolation).

Note that, in the present embodiment, it is assumed that the second relational equation is calculated by a method similar to that in the above-described second embodiment. However, the second relational equation may be calculated by a method similar to that in the above-described first embodiment.

<3.2 Configuration and Spectral Reflectances Prediction Method (Spectral Characteristics Prediction Method)>

An overall configuration of a printing system and a configuration of a print data generation apparatus are similar to those (see FIG. 2 and FIG. 3) of the above-described first embodiment, and accordingly, a description thereof will be omitted.

Figure 17:
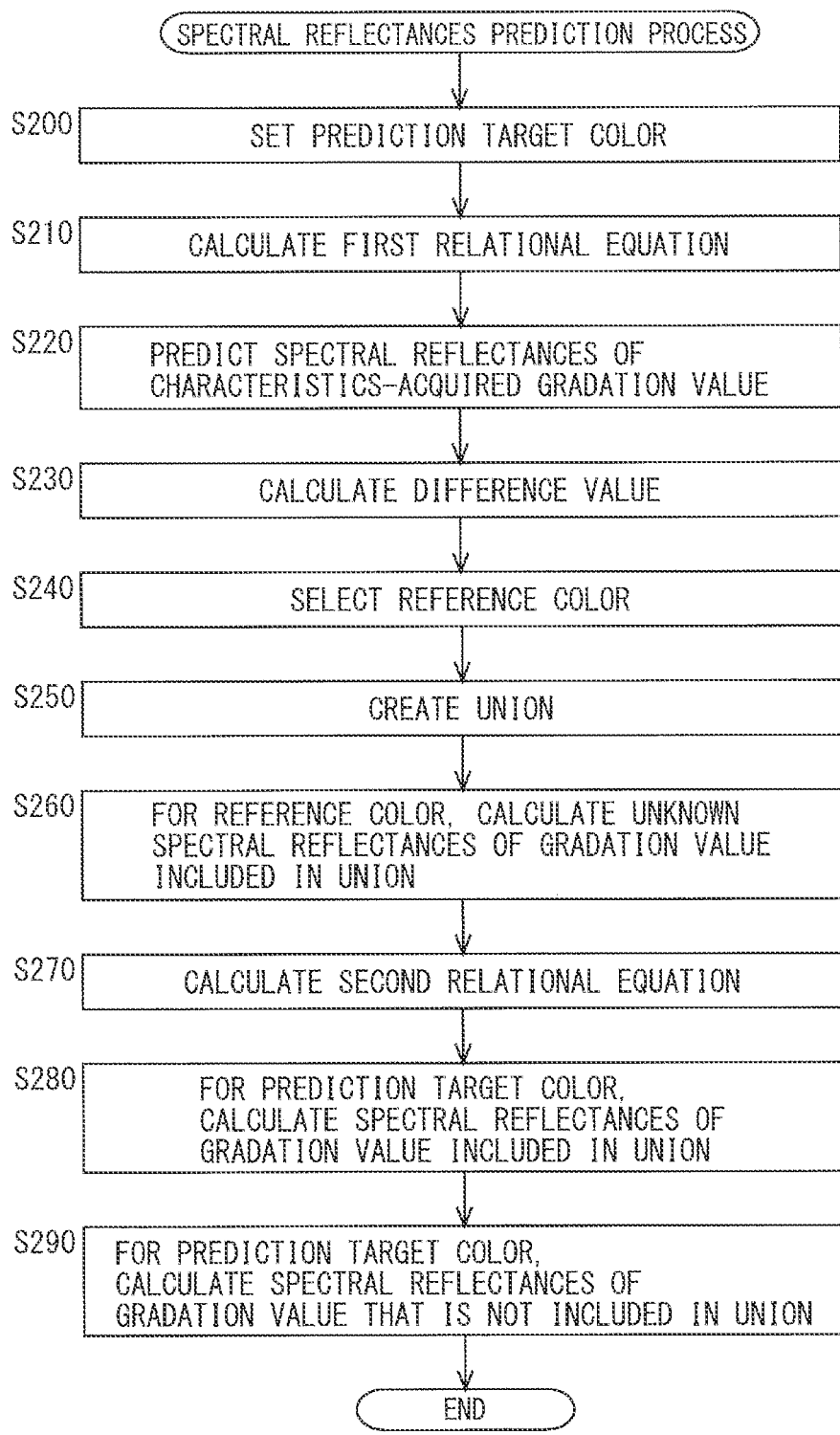
FIG. 17 is a flowchart illustrating a procedure of a spectral reflectances prediction process in the third embodiment.

FIG. 17 is a flowchart illustrating a procedure of a spectral reflectances prediction process in the present embodiment. Processes in Steps S200 to S240 are similar to the processes (see FIG. 4) of Steps S100 to S140 in the above-described first embodiment.

Figure 18:
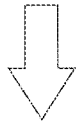
FIG. 18 is a diagram for explaining a case in which spectral reflectances of all gradation values included in unions are obtained regarding a reference color in the third embodiment.
Figure 19:
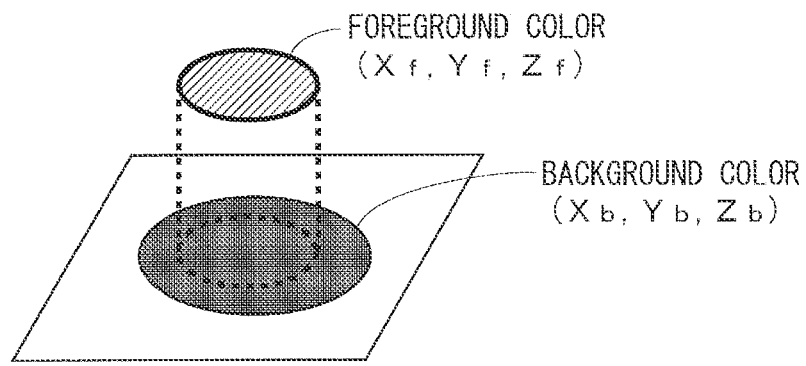
FIG. 19 is a diagram for explaining the technique of Deshpande et al., relating to a conventional example.
Figure 20:
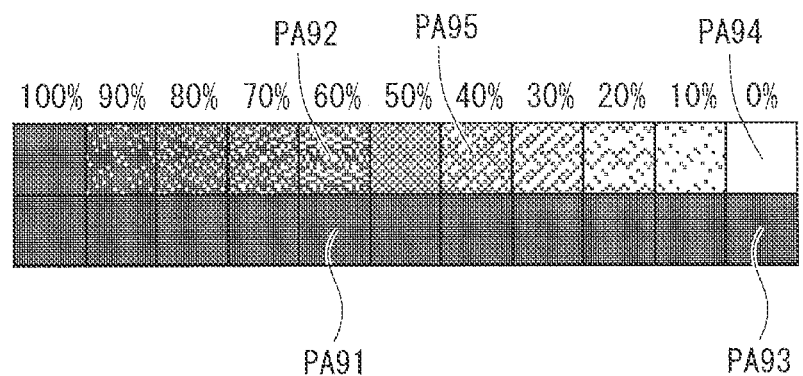
FIG. 20 is a diagram schematically illustrating an example of a C×F chart relating to the conventional example.
Figure 23:
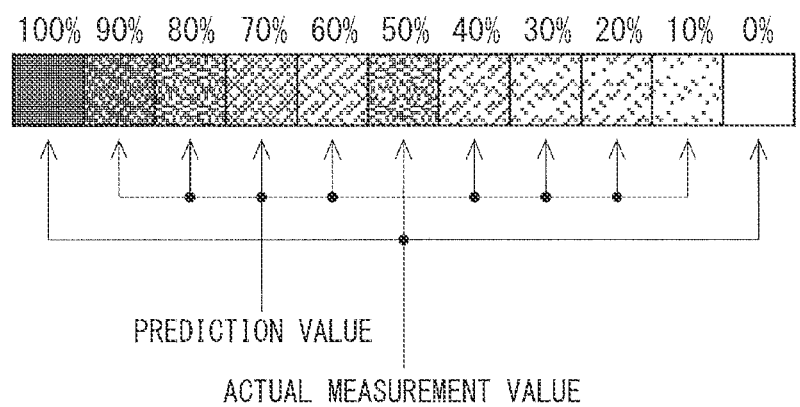
FIG. 23 is a diagram for explaining that a color based on an actual measurement value and a color based on a prediction value mismatch with each other in terms of a relationship relating to the conventional example.

After Step S240 is ended, the above-mentioned union is created (Step S250). Then, for the reference color, prediction values of unknown spectral reflectances among the spectral reflectances of the gradation values included in the union are obtained (Step S260). The prediction values of the unknown spectral reflectances are obtained, for example, by performing spline interpolation based on known spectral reflectances for the reference color. In the example illustrated in FIG. 16, the gradation value of 0.3 is included in the union, but spectral reflectances of the gradation value of 0.3 are not obtained regarding the reference color. Hence, in Step S260, the spectral reflectances of the gradation value of 0.3 for the reference color are obtained, for example, by performing spline interpolation based on spectral reflectances of at least three gradation values (at least three of the gradation values of 0, 0.2, 0.5, 0.8, and 1) for the reference color. Incidentally, for example, spectral reflectances eleven gradation values in increments of 0.1 from the gradation value of 0 to the gradation value of 1 are obtained regarding the reference color, and the gradation values for which the spectral reflectances are obtained regarding the prediction target color are 0, 0.5, and 1, then as seen from FIG. 18, spectral reflectances of all the gradation values included in the union are obtained regarding the reference color. In such a case, there are no spectral reflectances obtained in Step S260.

Next, with a maximum gradation value or a characteristics-acquired gradation value being taken as a reference gradation value, the second relational equation which represents the relationship between the spectral reflectances of the reference gradation value and the spectral reflectances of the above-mentioned process target gradation value for the reference color is obtained by the method similar to that in the above-described second embodiment (Step S270). Note that, in the present embodiment, the gradation values included in the union will be the process target gradation values. In the example illustrated in FIG. 16, the second relational equations corresponding to the gradation values of 0, 0.2, 0.3, 0.5, 0.8, and 1 are obtained by this Step S270. In this regard, for example, the second relational equation corresponding to the gradation value of 0.2 represents a relationship between the spectral reflectances of the gradation value of 0.3 and the spectral reflectances of the gradation value of 0.2 with the spectral reflectances of the gradation value of 0.3 being taken as a first reference and with the spectral reflectances of the gradation value of 0 being taken as a second reference. Moreover, for example, the second relational equation corresponding to the gradation value of 0.8 represents a relationship between the spectral reflectances of the gradation value of 1 and the spectral reflectances of the gradation value of 0.8 with the spectral reflectances of the gradation value of 1 being taken as a first reference and with the spectral reflectances of the gradation value of 0.5 being taken as a second reference.

After the second relational equation is obtained, the prediction values of the spectral reflectances of the gradation value included in the union among the plurality of gradation values serving as the prediction target gradation values are obtained by applying the spectral reflectances of the reference gradation value (the maximum gradation value or the characteristics-acquired gradation value) for the prediction target color to the corresponding second relational equation (Step S280). If eleven gradation values in increments of 0.1 from the gradation value of 0 to the gradation value of 1 are the prediction target gradation values, then in the example illustrated in FIG. 16, the prediction values of the spectral reflectances of the gradation values of 0, 0.2, 0.3, 0.5, 0.8, and 1 for the prediction target color are obtained by this Step S280. In this regard, for example, the prediction values of the spectral reflectances of the gradation value of 0.2 are obtained by applying the spectral reflectances of the gradation value of 0.3 for the prediction target color to the corresponding second relational equation. Further, for example, the prediction values of the spectral reflectances of the gradation value of 0.8 are obtained by applying the spectral reflectances of the gradation value of 1 for the prediction target color to the corresponding second relational equation. Note that, for the spectral reflectances of the gradation values of 0, 0.3, 0.5, and 1, actual measurement values may be directly used without using the second relational equations.

Finally, the prediction values of the spectral reflectances of the gradation value which is not included in the union among the plurality of gradation values serving as the prediction target gradation values are obtained by spline interpolation based on the prediction values obtained in Step S280 (Step S290). If eleven gradation values in increments of 0.1 from the gradation value of 0 to the gradation value of 1 are the prediction target gradation values, then in the example illustrated in FIG. 16, the prediction values of the spectral reflectances of the gradation values of 0.1, 0.4, 0.6, 0.7, and 0.9 for the prediction target color are obtained by this Step S280. At this time, the spine interpolation is performed using the prediction values (prediction values obtained in Step S280) of the spectral reflectances of at least three gradation values among the gradation values of 0, 0.2, 0.3, 0.5, 0.8, and 1. Note that, though linear interpolation can also be used in place of the spline interpolation, the prediction values are obtained more accurately by the spline interpolation than the linear interpolation. Incidentally in a case in which all the plurality of gradation values as the prediction target gradation values are included in the union, the spectral reflectances of all the prediction target gradation values for the prediction target color have been obtained at the point of time when Step S280 is ended, and accordingly, there are no spectral reflectances obtained in Step S290.

In such a way as described above, the prediction values of the spectral reflectances of the prediction target gradation value for the prediction target color are obtained. Thus, the spectral reflectances prediction process is ended.

Note that, in the present embodiment, a prediction target color setting step is achieved by Step S200, a first relational equation calculation step is achieved by Step S210, a first prediction step is achieved by Step S220, a difference value calculation step is achieved by Step S230, a reference color selection step is achieved by Step S240, a union creation step is achieved by Step S250, a third prediction step is achieved by Step S260, a second relational equation calculation step is achieved by Step S270, and a second prediction step is achieved by Step S280 and Step S290. Moreover, a second relational equation using step is achieved by Step S280, and an interpolation step is achieved by Step S290.

<3.3 Effect>

According to the present embodiment, an effect similar to those of the above-described first embodiment and the above-described second embodiment can be obtained. Further, use of the union can suppress the process of the spectral reflectance predictions program 141 from being complicated.

<4. Others>

The present invention is not limited to each of the above-described embodiments (including the modified examples), and is modifiable variously within the scope without departing from the spirit of the present invention. For example, in each of the above-described embodiments, the spectral reflectances obtained by printing the target ink on the base material are predicted; however, using the method of each of the above-described embodiments, spectral reflectances obtained by printing the target ink on black can also be predicted. Moreover, the above-described respective embodiments and the above-described respective modified examples can also be implemented in appropriate combination so as not to cause contradiction.

This application is an application claiming priority based on Japanese Patent Application No. 2021-078537 entitled "Spectral Characteristics Prediction Method and Spectral Characteristics Prediction Program" filed on May 6, 2021, and the contents of which are herein incorporated by reference.

What is claimed is:

1. A spectral characteristics prediction method for predicting spectral characteristics obtained by applying ink on a base material, the spectral characteristics prediction method comprising:
  a prediction target color setting step of setting, to a prediction target color, an ink color for which spectral characteristics of a maximum gradation value, spectral characteristics of a minimum gradation value, and spectral characteristics of at least one intermediate gradation value are obtained;
  a first relational equation calculation step of obtaining a first relational equation that, with an intermediate gradation value for which spectral characteristics are obtained regarding the prediction target color being taken as a characteristics-acquired gradation value, represents a relationship between spectral characteristics of the maximum gradation value and spectral characteristics of the characteristics-acquired gradation value for each of a plurality of sample colors which are a plurality of ink colors each of which spectral characteristics of the maximum gradation value, spectral characteristics of the minimum gradation value, and spectral characteristics of at least one intermediate gradation value are obtained;
  a first prediction step of, for each of the plurality of sample colors, obtaining prediction values of spectral characteristics of the characteristics-acquired gradation value for the prediction target color by applying the spectral characteristics of the maximum gradation value for the prediction target color to a corresponding first relational equation;
  a difference value calculation step of, for each of the plurality of sample colors, obtaining a difference value between the prediction values obtained in the first prediction step and actual measurement values of spectral characteristics of the characteristics-acquired gradation value for the prediction target color;
  a reference color selection step of selecting, as a reference color, a sample color for which a minimum difference value is obtained in the difference value calculation step among the plurality of sample colors;
  a second relational equation calculation step of, with the maximum gradation value or the characteristic-acquired gradation value being taken as a reference gradation value, and with a gradation value for which spectral characteristics are obtained regarding the reference color or the characteristics-acquired gradation value being taken as a process target gradation value, obtaining a second relational equation that represents a relationship between spectral characteristics of the reference gradation value and spectral characteristics of the process target gradation value for the reference color; and
  a second prediction step of, using the second relational equation, obtaining prediction values of spectral characteristics of a prediction target gradation value for the prediction target color.

2. The spectral characteristics prediction method according to claim 1, wherein
  a number of the characteristics-acquired gradation values is one, and
  in the second relational equation calculation step,
  regarding the process target gradation value between the maximum gradation value and the characteristics-acquired gradation value, with the spectral characteristics of the maximum gradation value being taken as a first reference and with the spectral characteristics of the characteristic-acquired gradation value being taken as a second reference, an equation that represents a relationship between the spectral characteristics of the maximum gradation value and the spectral characteristics of the process target gradation value is obtained as the second relational equation, and
  regarding the process target gradation value between the characteristics-acquired gradation value and the minimum gradation value, with the spectral characteristics of the characteristics-acquired gradation value being taken as a first reference and with the spectral characteristics of the minimum gradation value being taken as a second reference, an equation that represents a relationship between the spectral characteristics of the characteristics-acquired gradation value and the spectral characteristics of the process target gradation value is obtained as the second relational equation.

3. The spectral characteristics prediction method according to claim 2, wherein, in the second relational equation calculation step, data of the spectral characteristics are subjected to normalization so that a value of the spectral characteristics being taken as the second reference is 1.

4. The spectral characteristics prediction method according to claim 1, wherein
  the at least one intermediate gradation value for which the spectral characteristics are obtained regarding the prediction target color includes a first gradation value and a second gradation value smaller than the first gradation value, and in the second relational equation calculation step, regarding the process target gradation value between the maximum gradation value and the first gradation value, with the spectral characteristics of the maximum gradation value being taken as a first reference and with the spectral characteristics of the first gradation value being taken as a second reference, an equation that represents a relationship between the spectral characteristics of the maximum gradation value and the spectral characteristics of the process target gradation value is obtained as the second relational equation, regarding the process target gradation value between the first gradation value and the second gradation value, with the spectral characteristics of the first gradation value being taken as a first reference and with the spectral characteristics of the second gradation value being taken as a second reference, an equation that represents a relationship between the spectral characteristics of the first gradation value and the spectral characteristics of the process target gradation value is obtained as the second relational equation, and regarding the process target gradation value between the second gradation value and the minimum gradation value, with the spectral characteristics of the second gradation value being taken as a first reference and with the spectral characteristics of the minimum gradation value being taken as a second reference, an equation that represents a relationship between the spectral characteristics of the second gradation value and the spectral characteristics of the process target gradation value is obtained as the second relational equation.

5. The spectral characteristics prediction method according to claim 1, wherein the at least one intermediate gradation value for which the spectral characteristics are obtained regarding the prediction target color includes m pieces of gradation values from a first to as m-th gradation value with m being taken as an integer of 3 or more, a k-th gradation value is larger than a (k+1)-th gradation value with k being taken as an integer of 1 or more and (m−1) or less, and in the second relational equation calculation step, regarding the process target gradation value between the maximum gradation value and the first gradation value, with the spectral characteristics of the maximum gradation value being taken as a first reference and with the spectral characteristics of the first gradation value being taken as a second reference, an equation that represents a relationship between the spectral characteristics of the maximum gradation value and the spectral characteristics of the process target gradation value is obtained as the second relational equation, regarding the process target gradation value between the k-th gradation value and the (k+1)-th gradation value, with the spectral characteristics of the k-th gradation value being taken as a first reference and with the spectral characteristics of the (k+1)-th gradation value being taken as a second reference, an equation that represents a relationship between the spectral characteristics of the k-th gradation value and the spectral characteristics of the process target gradation value is obtained as the second relational equation, and regarding the process target gradation value between the m-th gradation value and the minimum gradation value, with the spectral characteristics of the m-th gradation value being taken as a first reference and with the spectral characteristics of the minimum gradation value being taken as a second reference, an equation that represents a relationship between the spectral characteristics of the m-th gradation value and the spectral characteristics of the process target gradation value is obtained as the second relational equation.

6. The spectral characteristics prediction method according to claim 1, wherein, in the second relational equation calculation step, an equation that represents a relationship between the spectral characteristics of the maximum gradation value and the spectral characteristics of the process target gradation value for the reference color is obtained as the second relational equation, and in the second prediction step, the prediction values of the spectral characteristics of the prediction target gradation value for the prediction target color is obtained by applying the spectral characteristics of the maximum gradation value for the prediction target color to the second relational equation.

7. The spectral characteristics prediction method according to claim 1, wherein a number of the prediction target gradation values is two or more, and the second prediction step includes:

a second relational equation using step of obtaining prediction values of spectral characteristics of the gradation value for which the spectral characteristics are obtained regarding the reference color among two or more of the prediction target gradation values by applying spectral characteristics of the reference gradation value for the prediction target color to a corresponding second relational equation; and an interpolation step of obtaining prediction values of spectral characteristics of a gradation value for which the spectral characteristics are not obtained regarding the reference color among two or more of the prediction target gradation values by performing spline interpolation based on the prediction values obtained in the second relational equation using step.

8. The spectral characteristics prediction method according to claim 1, further comprising a union creation step of creating a union of the gradation value for which spectral characteristics are obtained regarding the reference color and the gradation value for which spectral characteristics are obtained regarding the prediction target color, wherein, in the second relational equation calculation step, the gradation value included in the union is taken as the process target gradation value, a number of the prediction target gradation values is two or more, and the second prediction step includes:

a second relational equation using step of obtaining prediction values of spectral characteristics of the gradation value included in the union among two or more of the prediction target gradation values by applying spectral characteristics of the reference gradation value for the prediction target color to a corresponding second relational equation; and an interpolation step of obtaining prediction values of spectral characteristics of a gradation value not included in the union among two or more of the prediction target gradation values by performing spline interpolation based on the prediction values obtained in the second relational equation using step.

9. The spectral characteristics prediction method according to claim 8, further comprising a third prediction step, between the union creation step and the second relational equation calculation step, of obtaining prediction values of spectral characteristics, which are spectral characteristics of the process target gradation value for the reference color, of a gradation value for which spectral characteristics are not obtained regarding the reference color by performing spline interpolation based on known spectral characteristics for the reference color.

10. The spectral characteristics prediction method according to claim 1, wherein the difference value obtained in the difference value calculation step is a square error of the prediction values obtained in the first prediction step and the actual measurement values of the spectral characteristics of the characteristics-acquired gradation value for the prediction target color.

11. The spectral characteristics prediction method according to claim 1, wherein the difference value obtained in the difference value calculation step is a color difference based on the prediction values obtained in the first prediction step and the actual measurement values of the spectral characteristics of the characteristics-acquired gradation value for the prediction target color.

12. The spectral characteristics prediction method according to claim 1, wherein the spectral characteristics are any of spectral reflectances, spectral absorption factors, and spectral absorption coefficients.

13. A non-transitory computer-readable recording medium recording a spectral characteristics prediction program of predicting spectral characteristics obtained by applying ink on a base material, wherein the spectral characteristics prediction program causes a computer to execute:

a prediction target color setting step of setting, to a prediction target color, an ink color for which spectral characteristics of a maximum gradation value, spectral characteristics of a minimum gradation value, and spectral characteristics of at least one intermediate gradation value are obtained;

a first relational equation calculation step of obtaining a first relational equation that, with an intermediate gradation value for which spectral characteristics are obtained regarding the prediction target color being taken as a characteristics-acquired gradation value, represents a relationship between spectral characteristics of the maximum gradation value and spectral characteristics of the characteristics-acquired gradation value for each of a plurality of sample colors which are a plurality of ink colors for each of which spectral characteristics of the maximum gradation value, spectral characteristics of the minimum gradation value, and spectral characteristics of at least one intermediate gradation value are obtained;

a first prediction step of, for each of the plurality of sample colors, obtaining prediction values of spectral characteristics of the characteristics-acquired gradation value for the prediction target color by applying the spectral characteristics of the maximum gradation value for the prediction target color to a corresponding first relational equation;

a difference value calculation step of, for each of the plurality of sample colors, obtaining a difference value between the prediction values obtained in the first prediction step and actual measurement values of spectral characteristics of the characteristics-acquired gradation value for the prediction target color;

a reference color selection step of selecting, as a reference color, a sample color for which a minimum difference value is obtained in the difference value calculation step among the plurality of sample colors;

a second relational equation calculation step of, with the maximum gradation value or the characteristic-acquired gradation value being taken as a reference gradation value, and with a gradation value for which spectral characteristics are obtained regarding the reference color or the characteristics-acquired gradation value being taken as a process target gradation value, obtaining a second relational equation that represents a relationship between spectral characteristics of the reference gradation value and spectral characteristics of the process target gradation value for the reference color; and a second prediction of, using the second relational equation, obtaining prediction values of spectral characteristics of a prediction target gradation value for the prediction target color.

* * * * *